(12) United States Patent
Kasakawa

(10) Patent No.: US 11,701,209 B2
(45) Date of Patent: Jul. 18, 2023

(54) INTERDENTAL CLEANING TOOL PRODUCTION METHOD

(71) Applicant: KOBAYASHI PHARMACEUTICAL CO., LTD., Osaka (JP)

(72) Inventor: Kaoru Kasakawa, Ibaraki (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 418 days.

(21) Appl. No.: 16/309,676

(22) PCT Filed: Sep. 29, 2017

(86) PCT No.: PCT/JP2017/035734
§ 371 (c)(1),
(2) Date: Mar. 22, 2019

(87) PCT Pub. No.: WO2018/062553
PCT Pub. Date: Apr. 5, 2018

(65) Prior Publication Data
US 2019/0231496 A1    Aug. 1, 2019

(30) Foreign Application Priority Data
Sep. 30, 2016   (JP) ................. 2016-194504

(51) Int. Cl.
*A61C 15/04*    (2006.01)
*B29C 45/28*    (2006.01)
(Continued)

(52) U.S. Cl.
CPC ............ *A61C 15/046* (2013.01); *A61C 15/04* (2013.01); *B29C 33/44* (2013.01);
(Continued)

(58) Field of Classification Search
None
See application file for complete search history.

(56) References Cited

U.S. PATENT DOCUMENTS

| 4,006,750 A | 2/1977 | Chodorow |
| 4,029,453 A * | 6/1977 | Campion, Jr. ....... A61C 15/046 |
| | | 425/111 |

(Continued)

FOREIGN PATENT DOCUMENTS

| JP | 3-47251 A | 2/1991 |
| JP | 9-70409 A | 3/1997 |

(Continued)

OTHER PUBLICATIONS

Extended European Search Report dated Mar. 12, 2020 in European Patent Application No. 17856500.8.
(Continued)

*Primary Examiner* — Francisco W Tschen
*Assistant Examiner* — Elisa H Vera
(74) *Attorney, Agent, or Firm* — Birch, Stewart, Kolasch & Birch, LLP

(57) ABSTRACT

An interdental cleaning tool producing method that enables cost reduction is provided. An interdental cleaning tool producing method according to the present invention includes; a first step of preparing a mold provided with at least one first cavity for molding a cleaning tool main body including two supporting pieces that are arranged with a predetermined interval and a handle portion that couples the two supporting pieces and can be held in a hand, the mold being configured such that at least one thread member to span between the two supporting pieces can be arranged in the mold; a second step of arranging the thread member in the mold; a third step of filling the first cavity with a resin material via a gate provided in the mold using a hot runner method; and a fourth step of removing the thread member and the cleaning tool main body fixed to the thread member from the mold.

7 Claims, 22 Drawing Sheets

(51) Int. Cl.
  *B29C 45/14* (2006.01)
  *B29C 33/44* (2006.01)
  *B29C 45/27* (2006.01)
  *B29C 45/40* (2006.01)
  *B29L 31/00* (2006.01)

(52) U.S. Cl.
  CPC ........ *B29C 45/14549* (2013.01); *B29C 45/27* (2013.01); *B29C 45/28* (2013.01); *B29C 45/40* (2013.01); *B29L 2031/753* (2013.01)

(56) References Cited

U.S. PATENT DOCUMENTS

2003/0008034 A1* 1/2003 Niewels ................ B29C 45/278
                                                        425/549
2005/0236011 A1  10/2005 Chodorow
2011/0290275 A1  12/2011 Ochs
2016/0067021 A1   3/2016 Zwimpfer et al.

FOREIGN PATENT DOCUMENTS

JP      3066189 U      2/2000
JP      2001-161444 A  6/2001

OTHER PUBLICATIONS

Office Action dated Apr. 28, 2020, in Japanese Patent Application No. 2016-194504.
International Search Report, issued in PCT/JP2017/035734, PCT/ISA/210, dated Dec. 12, 2017.
Written Opinion of the International Searching Authority, issued in PCT/JP2017/035734, PCT/ISA/237, dated Dec. 12, 2017.

* cited by examiner

INTERDENTAL CLEANING TOOL PRODUCTION METHOD

TECHNICAL FIELD

The present invention relates to an interdental cleaning tool producing method.

BACKGROUND ART

Conventionally, various types of interdental cleaning tools for removing dental plaque stuck between teeth have been proposed. For example, Patent Literature 1 proposes an interdental cleaning tool including: a cleaning tool main body made of a resin that has supporting pieces that are arranged with a predetermined interval and a handle portion that couples the supporting pieces and can be held in a hand; and a thread member called floss that spans between the supporting pieces. Such an interdental cleaning tool is molded as follows. That is, the thread member is arranged in a mold, and then the cleaning tool main body is molded through injection molding. At this time, molding is performed such that a plurality of cleaning tool main bodies are fixed to a single thread member. After the molding is finished, the thread member is cut, and the interdental cleaning tool is thus completed.

CITATION LIST

Patent Literature

Patent Literature 1: Japanese Registered Utility Model No. 3066189

SUMMARY OF INVENTION

Technical Problem

In the producing method as mentioned above, a cold runner method is employed, and not only the cleaning tool main body but also a large number of runner portions around the cleaning tool main body are molded in a state in which the thread member is fixed. Therefore, when the thread member is cut after the molding is finished, the runner portions fixed to the thread member are also cut from the cleaning tool main body together with the thread member. Since the runner portions are formed of the same resin material as that for forming the cleaning tool main body, it is conceivable to recycle the runner portions to reduce costs. However, despite the generation of such a large number of runner portions, it is difficult to recycle the runner portions as the resin material because the thread member is fixed to the runner portions and needs to be separated from the runner portions in order to be able to recycle the runner portions.

The present invention was made in order to solve this problem, and an object thereof is to provide an interdental cleaning tool producing method that enables cost reduction.

Solution to Problem

An interdental cleaning tool producing method according to the present invention includes: a first step of preparing a mold provided with at least one first cavity for molding a cleaning tool main body including two supporting pieces that are arranged with a predetermined interval and a handle portion that couples the two supporting pieces and can be held in a hand, the mold being configured such that at least one thread member to span between the two supporting pieces can be arranged in the mold; a second step of arranging the thread member in the mold; a third step of filling the first cavity with a resin material via a gate provided in the mold using a hot runner method; and a fourth step of removing the thread member and the cleaning tool main body fixed to the thread member from the mold.

With this configuration, the cavity is filled with the resin material using a hot runner method, and therefore, a large number of runner portions are not formed unlike a typical cold runner method. If a thread member is fixed to a resin material, the resin material will be disposed of due to difficulty in removing the thread member. However, with the above-described configuration, the amount of resin material to be disposed of can be significantly reduced. As a result, the production cost can be significantly reduced. Moreover, additional time to cool the runner portions is needed in the case of the cold runner method, but with the present invention, such time is not needed, thus making it possible to improve the production cycle.

In the above-mentioned interdental cleaning tool producing method, the thread member and the cleaning tool main body can be removed from the mold using various methods. For example, a configuration can be employed in which, in the fourth step, the cleaning tool main body fixed to the thread member is removed from the mold together with the thread member by moving at least the thread member from the mold.

With this configuration, at least one cleaning tool main body is attached to a single thread member, thus making it easy to remove the cleaning tool main body fixed to the thread member from the mold together with the thread member by moving at least the thread member from the mold. Therefore, by also employing the above-described hot runner method, substantially no resin material is disposed of, thus making it possible to reduce the cost.

Alternatively, a configuration can be employed in which the interdental cleaning tool producing method further includes a step of cutting the thread member at positions outside the supporting pieces of the cleaning main body inside the mold prior to the fourth step.

With this configuration, the thread member can be cut inside the mold, and therefore, a subsequent step of cutting the thread member becomes unnecessary.

Alternatively, a configuration can be employed in which the mold is further provided with a second cavity for molding a removal member on at least one end portion side of the thread member; in the third step, the first cavity and the second cavity are filled with the resin material using a hot runner method; and in the fourth step, the thread member and the cleaning tool main body fixed to the thread member are removed from the mold together with the removal member by moving the removal member from the mold.

With this configuration, at least one cleaning tool main body is attached to a single thread member, and the removal member is molded at at least one of the end portions of the thread member, thus making it easy to remove the thread member and the cleaning tool main body fixed to the thread member from the mold together with the removal member by moving at least the removal member from the mold. Such a removal member need only have a size that allows at least the thread member to be fixed to the removal member, and therefore, the removal member need not be formed in a size similar to the sizes of the runner portions of the conventional example. Since the thread member is fixed to this removal member, it is difficult to recycle the removal member.

However, the size of the removal member can be reduced to the minimum required size, and therefore, the amount of resin material to be disposed of can be suppressed to the minimum even if the removal member is disposed of. Accordingly, as a result, it is possible to reduce the cost.

Moreover, the thread member and the cleaning tool main body can be moved to a desired position by moving the removal member, thus making it possible to improve production efficiency.

When the removal member is used in the above-mentioned interdental cleaning tool producing method, the thickness of the removal member can be set to be smaller than or equal to the thickness of the cleaning tool main body. Accordingly, the removal member can be cooled in less time than the time required to cool the cleaning tool main body, thus making it possible to prevent an increase in the production cycle time.

When the removal member is used in the above-mentioned interdental cleaning tool producing method, the volume of the removal member can be set to be smaller than or equal to the volume of the cleaning tool main body. Accordingly, the removal member can be cooled in less time than the time required to cool the cleaning tool main body, thus making it possible to prevent an increase in the production cycle time.

In the method in which the cleaning tool main body fixed to the thread member is removed from the mold together with the thread member by moving the thread member from the mold, and the method in which the removal member is used, out of the above-mentioned interdental cleaning tool producing methods, in the fourth step, a new thread member for the subsequent molding process can be arranged in the mold after the thread member to which the cleaning tool main body is fixed is moved in a direction in which the thread member extends. Accordingly, the interdental cleaning tool can be efficiently molded.

When the removal member is used in the above-mentioned interdental cleaning tool producing method, a configuration can be employed in which the second cavities are formed at positions corresponding to the two ends of the thread member, the first cavity and second cavities are filled with the resin material in the third step, the thread member and at least one cleaning tool main body fixed to the thread member are moved from the mold in the fourth step by moving, from the mold, the removal members provided at the two ends of the thread member with a constant distance being maintained between the removal members, and a fifth step is further provided in which the removal members, the thread member, and at least one cleaning tool main body fixed to the thread member are arranged on an examination table and then are checked.

Accordingly, the cleaning tool main body fixed to the thread member can be moved with the thread member being extended between the removal members. Arranging the thread member and the cleaning tool main body on an examination table as they are makes it possible to arrange them in a state in which they are lined up, and therefore, they can be easily and efficiently checked.

In the above-mentioned interdental cleaning tool producing methods, a valve gate system in which the gate is opened/closed using a valve or an open gate system in which no valves are included may be employed. It should be noted that, when the valve gate system is employed, the cleaning tool main body is cut off from at the gate by a valve blocking the resin material, thus making it possible to prevent the resin material from extending from the cleaning tool main body like string. In particular, the interdental cleaning tool according to the present invention is used in the oral cavity, and therefore, it is not desired that the resin material extends like string.

Advantageous Effects of the Invention

The interdental cleaning tool producing method according to the present invention enables cost reduction.

DESCRIPTION OF EMBODIMENTS

A. First Embodiment

Hereinafter, a first embodiment of an interdental cleaning tool producing method according to the present invention will be described with reference to the drawings. In the following description, first, the outline of an interdental cleaning tool will be described, and then a method for producing this interdental cleaning tool will be described.

1. Outline of Interdental Cleaning Tool

Figure 1:
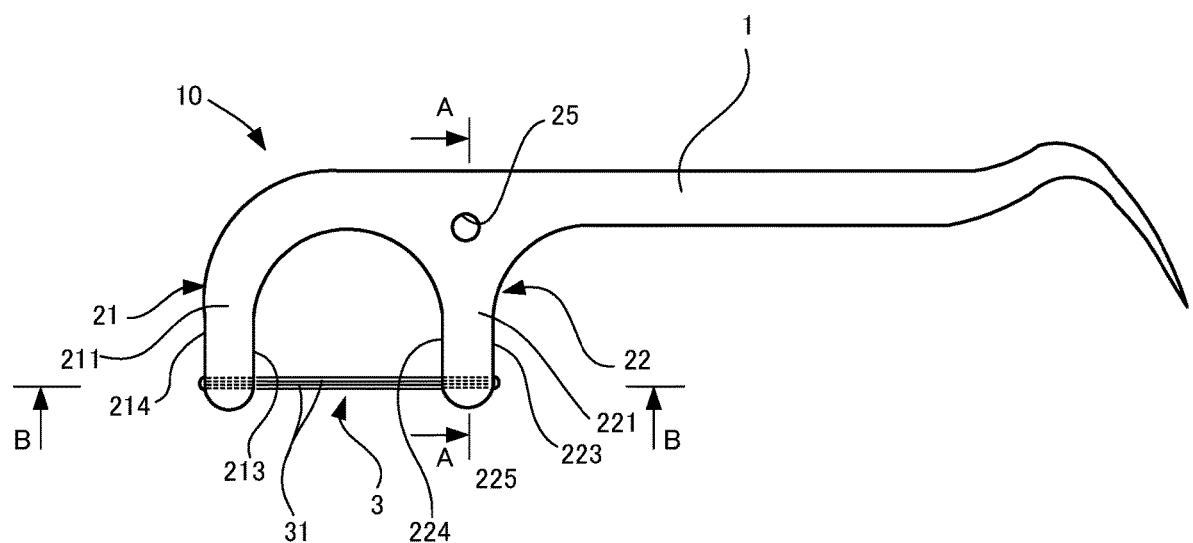
FIG. 1 is a front view of an interdental cleaning tool according to a first embodiment of the present invention.
Figure 2:
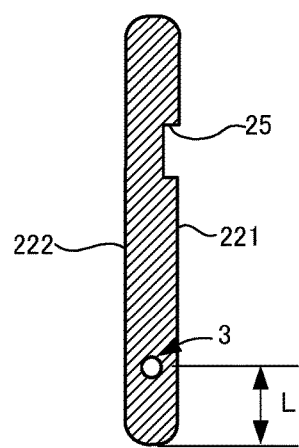
FIG. 2 is a cross-sectional view taken along line A-A in FIG. 1.
Figure 3:
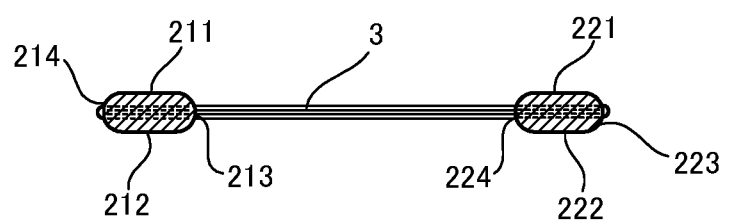
FIG. 3 is a cross-sectional view taken along line B-B in FIG. 1.

Hereinafter, the outline of an interdental cleaning tool will be described with reference to FIGS. 1 to 3. FIG. 1 is a front view of an interdental cleaning tool according to this embodiment, FIG. 2 is a cross-sectional view taken along line A-A in FIG. 1, and FIG. 3 is a cross-sectional view taken along line B-B in FIG. 1. It should be noted that the following description will be made based on the directions in the diagram shown in FIG. 1 for the sake of ease of description. Regarding a handle portion, the left side in FIG. 1 may also be referred to as a front end side, and the right side may also be referred to as a rear end side. However, the directions of the present invention are not limited to the thus-determined directions.

As shown in FIG. 1, this interdental cleaning tool includes a cleaning tool main body 10 made of a resin, and a thread member 3 that is attached to the cleaning tool main body 10 and is used to remove interdental dental plaque. The cleaning tool main body 10 includes a handle portion 1 extending in a rod-like manner, and two supporting pieces 21 and 22 protrude from this handle portion 1 with a predetermined interval. Here, the supporting piece protruding from the end portion of the handle portion 1 is referred to as a "first supporting piece 21", and the supporting piece extending in parallel with the first supporting piece 21 is referred to as a "second supporting piece 22". The above-described thread member 3 spans between the supporting pieces 21 and 22, and extends in parallel with the handle portion 1. The two end portions of the thread member 3 are respectively coupled to the supporting pieces 21 and 22. Hereinafter, the members will be described in detail.

2. Cleaning Tool Main Body

Various materials can be used to form the supporting pieces 21 and 22 and the handle portion 1. Examples thereof include resin materials such as polystyrene, polyethylene, polypropylene, and polyethylene terephthalate. Out of these resin materials, polystyrene typically has a small shrinkage percentage and high rigidity, and is thus suitable for a case where the thread member 3 spans between the supporting pieces 21 and 22.

In the cleaning tool main body 10, a circular recessed portion 25 is formed near the base end portion of the second supporting piece 22 in order to prevent a trace of the gate from protruding from the surface of the handle portion 1. It is sufficient that the diameter of the recessed portion 25 is set to be larger than the diameter of the contact trace of the gate. In a case where a valve gate-type mold 100 is used as described later, an annular protruding portion, which is a contact trace of the valve gate, may be formed inside the recessed portion 25. The diameter of the contact trace of the gate is typically 0.8 to 4 mm, and preferably 0.8 to 2.5 mm.

The supporting pieces 21 and 22 are formed in a plate shape. In the following description, the surfaces of the supporting pieces 21 and 22 are named as follows: the surfaces on the front side of the plane of FIG. 1 are respectively referred to as "front surfaces 211 and 221", the surfaces on the rear side of the plane of FIG. 1 are respectively referred to as "rear surfaces 212 and 222", the surfaces on the right side of FIG. 1 are respectively referred to as "right surfaces 213 and 223", and the surfaces on the left side are respectively referred to as "left surfaces 214 and 224". In the supporting pieces 21 and 22, positions through which the thread member 3 passes are located near the leading ends of the supporting pieces 21 and 22. That is, the distance L between such positions and the leading ends of the supporting pieces 21 and 22 is preferably 2.9 mm or more and 4 mm or less, and more preferably 2.9 mm or more and 3.2 mm or less.

3. Thread Member

Next, the thread member 3 will be described. The thread member 3 is constituted by a single multifilament or a bundle of multifilaments 31. Hereinafter, in particular, a case where a plurality of multifilaments 31 are used to form the thread member will be described. Each of the multifilaments 31 is obtained by twisting together a plurality of monofilaments made of nylon. The coefficient of friction of nylon is larger than that of polyethylene and the like, and therefore, use of nylon has the advantage that a dental plaque scraping effect is improved. It should be noted that the multifilament 31 may be a bundle of monofilaments in which the monofilaments are not twisted together.

The thickness of each multifilament 31 is not particularly limited, but is preferably 100 to 250 deniers, and more preferably 100 to 160 deniers, for example. If the thickness is smaller than 100 deniers, there is a risk that the multifilaments 31 will come out of the supporting pieces 21 and 22. If the thickness is larger than 250 deniers, it may be difficult to insert the multifilaments 31 between teeth.

The number of multifilaments 31 included in the thread member 3 is not particularly limited, but is preferably 3 to 7, for example. If the number of multifilaments 31 is 3 or more, a dental plaque scraping effect will be improved, whereas if the number of multifilaments 31 is 7 or less, it will be easy to insert the thread member 3 between teeth, and the handleability will be improved, thus making it possible to improve the dental plaque scraping effect.

The number of monofilaments included in the multifilament 31 is preferably 15 to 120, more preferably 30 to 100, and particularly preferably 50 to 100.

It is preferable that the maximum twist number of the multifilament 31 per meter is 500 or less. Specifically, the maximum twist number is preferably 300 or less, more preferably 200 or less, and particularly preferably 170 or less. The following is the reason for this. That is, if the twist number of the multifilament 31 is too large, the multifilament will be too thin, and therefore, a cleaning effect may be hard to obtain. The minimum twist number of the multifilament 31 per meter is not particularly limited, and the multifilament 31 may also include monofilaments that are not twisted together. However, the minimum twist number of the multifilament 31 is preferably 50 or more, for example, from the viewpoint that the monofilaments are less likely to come apart and spread out during the production of the interdental cleaning tool, thus making it easy to produce the interdental cleaning tool.

4. Coupling Between Thread Member and Supporting Pieces

Subsequently, a method for coupling the thread member 3 to the supporting pieces 21 and 22 will be described. As shown in FIG. 1, two end portions of the thread member 3 respectively pass through the supporting pieces 21 and 22. Specifically, the left end portion of the thread member 3 passes through the right surface 213 of the first supporting piece 21 and protrudes from the left surface 214. Similarly, the right end portion of the thread member 3 passes through the left surface 224 of the second supporting piece 22 and protrudes from the right surface 223.

5. Interdental Cleaning Tool Producing Method

Next, a method for producing the interdental cleaning tool configured as mentioned above will be described. This interdental cleaning tool is produced through injection molding.

First, a mold will be described.

Figure 4:
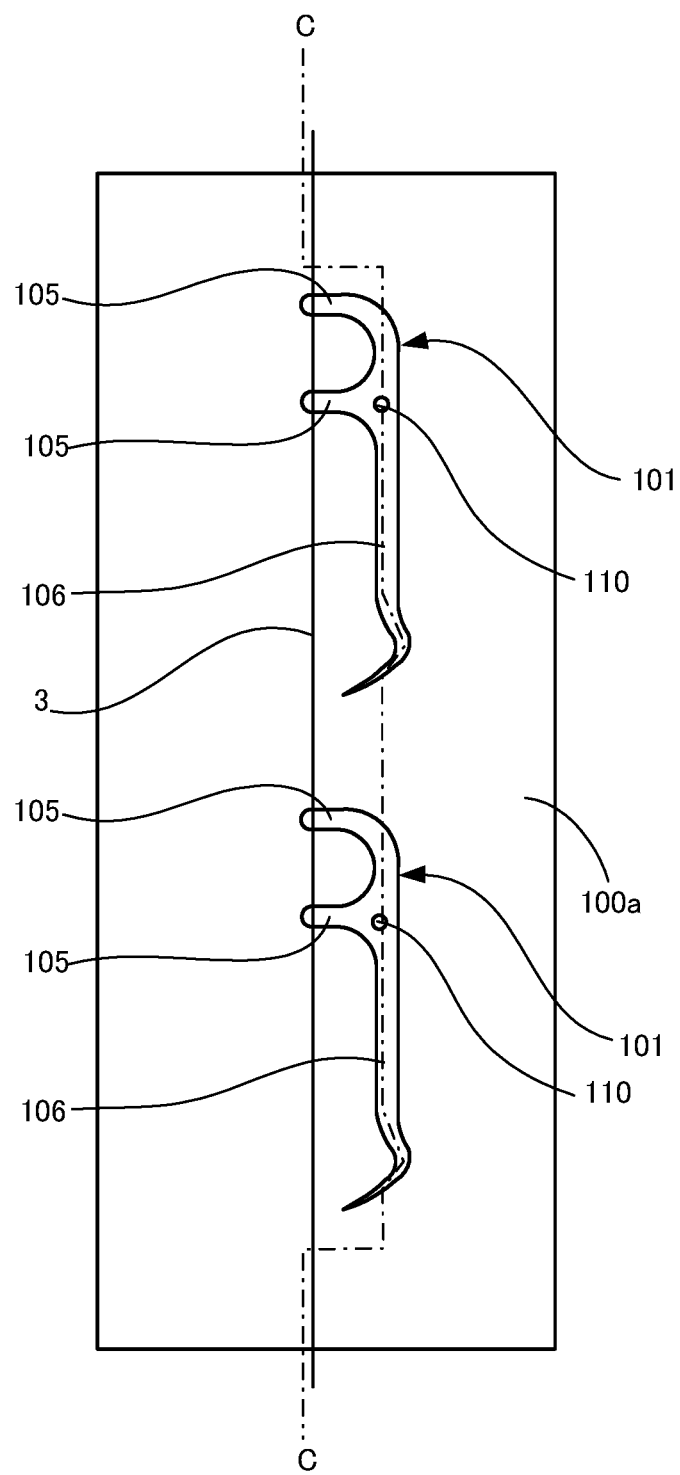
FIG. 4 is a schematic plan view showing a stationary mold of a mold for producing the interdental cleaning tool shown in FIG. 1.
Figure 5:
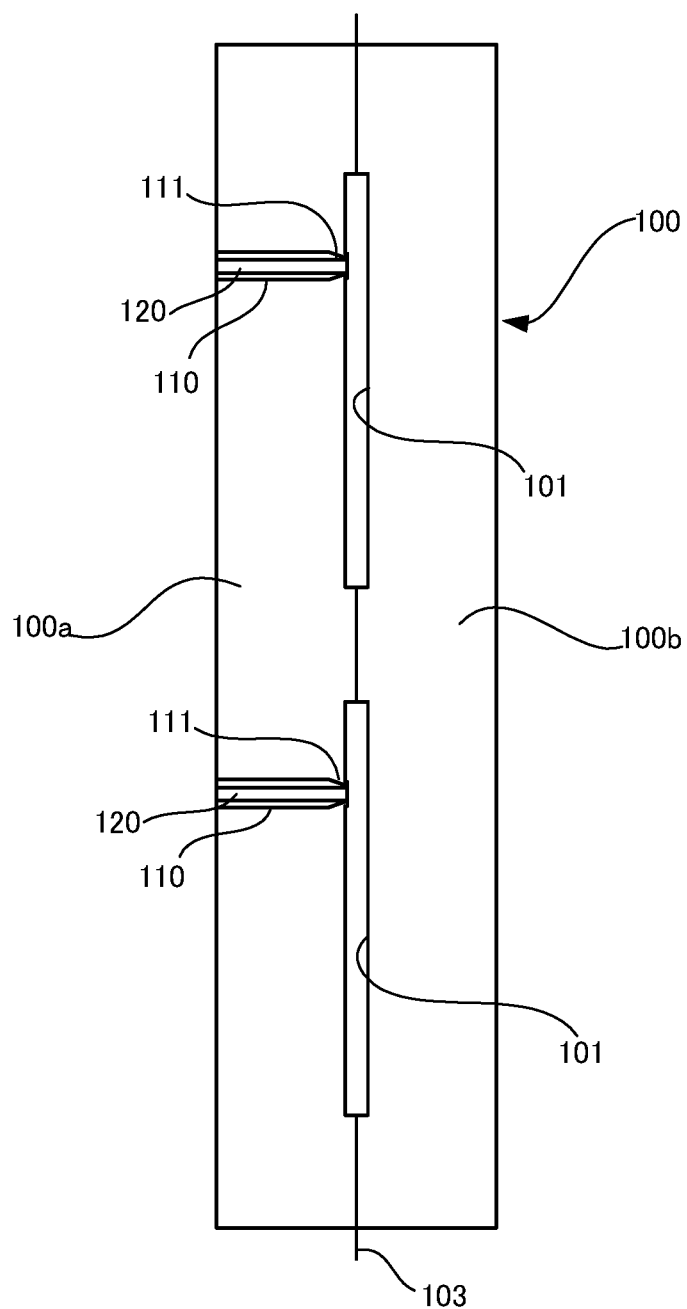
FIG. 5 is a cross-sectional view taken along line C-C in FIG. 4.

FIG. 4 is a plan view of a stationary mold of the mold, and FIG. 5 is a cross-sectional view of the mold shown in FIG. 4 taken along line C-C. It should be noted that both the stationary mold and a movable mold are shown in FIG. 5. As shown in FIGS. 4 and 5, a mold 100 is used in a so-called hot runner method, and includes a stationary mold 100a and a movable mold 100b. A plurality of (two in this embodiment) first cavities 101 for molding a plurality of cleaning tool main bodies 10 are formed in a surface of each of the stationary mold 100a and the movable mold 100b, the surfaces being brought into contact with each other.

The plurality of first cavities 101 corresponding to the cleaning tool main bodies 10 are arranged such that portions (referred to as "handle cavities 106" hereinafter) corresponding to the handle portions 1 of the cleaning tool main bodies 10 are lined up in a linear manner. A single thread member 3 is arranged extending in the mold 100. This thread member 3 is arranged so as to span between portions (referred to as "supporting piece cavities 105" hereinafter) corresponding to the supporting pieces 21 and 22 in the first cavities 101. Accordingly, a single thread member 3 is arranged so as to connect the four supporting piece cavities 105. In the mold 100, such a position at which the thread member 3 is arranged is referred to as a "thread member position". It should be noted that, although not shown in the diagrams, grooves in which the thread member 3 is to be arranged are formed at portions of the thread member position excluding portions of the thread member position located in the first cavities 101 of the movable mold 100b.

The stationary mold 100a is provided with gates 110 used to supply a molten resin material to the cavities 101, and valves 120 that can be opened and closed are attached to the gates 110. More specifically, each of the gates 110 is formed to have a circular cross section, and includes a leading end region 111 whose diameter decreases toward the cavity 101. The valve 120 having a columnar shape is provided so as to close the opening of the leading end region 111. Each of the valves 120 can be moved back and forward in the direction in which the gate 110 extends, and the gate 110 is closed when the leading end of the valve 120 reaches the opening of the leading end region 111. On the other hand, when the valve 120 is moved back from the opening of the leading end region 111, the resin material flows into the cavity 101 through a gap between the outer circumferential surface of the valve 120 and the inner wall surface of the leading end region 111.

The movable mold 100b is configured so as to be brought close to and moved away from the stationary mold 100a. The resin material is poured into the cavities 101 while the movable mold 100b is in contact with the stationary mold 100a. After a predetermined cooling time has elapsed, the movable mold 100b is moved away from the stationary mold 100a.

Figure 6:
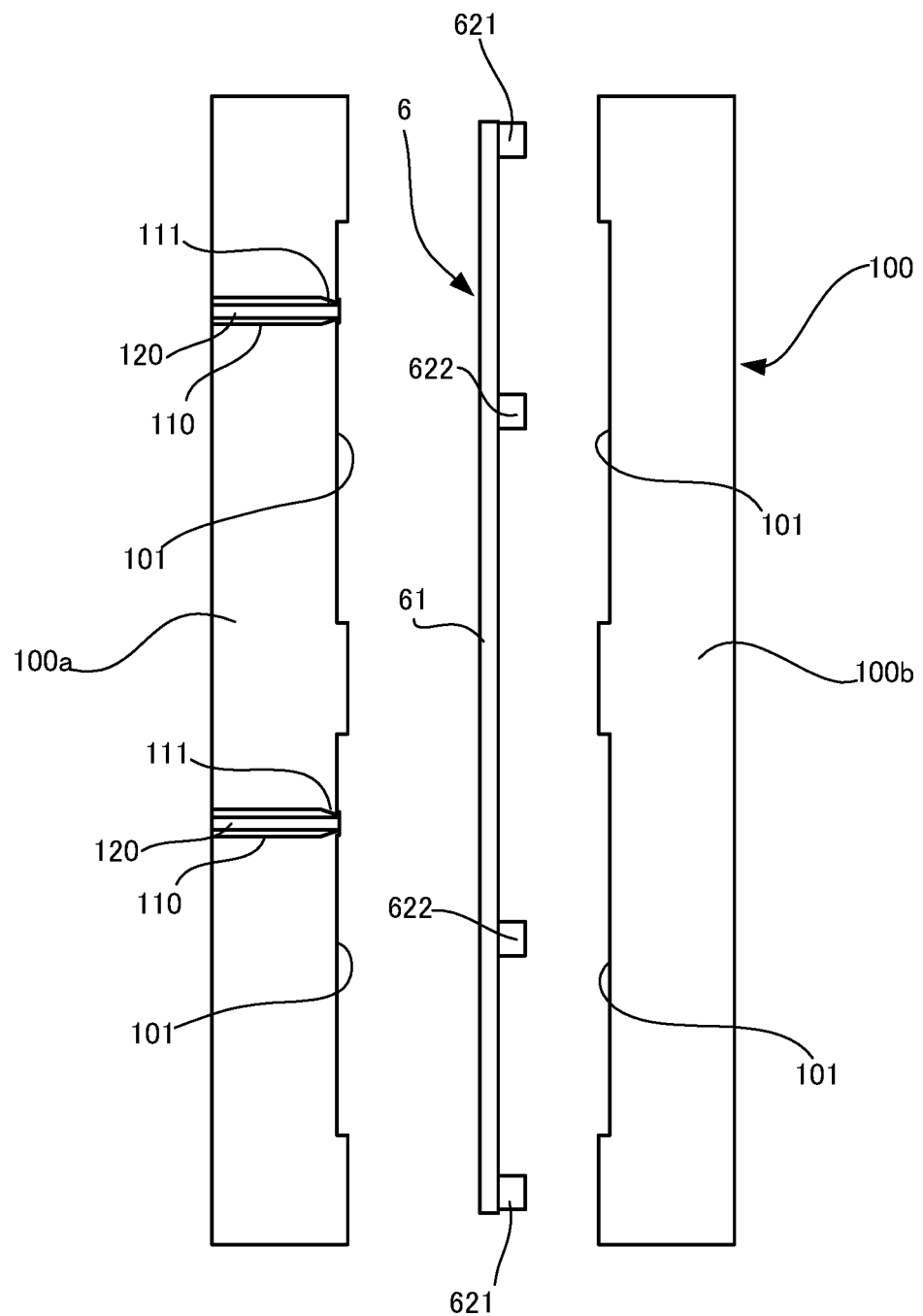
FIG. 6 is a diagram showing a state in which a support is arranged between the stationary mold and a movable mold of the mold in FIG. 4.

As shown in FIG. 6, a support 6 is to be arranged between the stationary mold 100a and the movable mold 100b. This support 6 includes a main body portion 61 extending in a plate-like manner, and four pick-up members 621 and 622 that are respectively provided at the two ends of the main body portion 61 and positions corresponding to the first cavities 101 between the two ends of the main body portion 61. Here, the pick-up members provided at the two ends of the main body portion 61 are referred to as "first pick-up members 621", and the pick-up members provided at the positions corresponding to the first cavities 101 are referred to as "second pick-up members 622". A robot arm (not shown) is attached to the vicinity of the center of the main body portion 61, and can be used to move the support 6. Each of the first pick-up members 621 is arranged on an end portion side with respect to the first cavities 101 in the mold 100. When the main body portion 61 is arranged between the stationary mold 100a and the movable mold 100b, the first pick-up members 621 pick up portions of the thread member 3 located outside the cleaning tool main bodies 10, and the second pick-up members 622 respectively pick up the cleaning tool main bodies 10. There is no particular limitation on the configurations of the pick-up members 62 as long as the pick-up members 62 can pick up the thread member 3 and the cleaning tool main bodies 10. For example, the pick-up members can be configured to pick up the thread member 3 and the cleaning tool main bodies 10 through the suction of air. Regarding the thread member 3, means for holding the thread member 3 may be used instead of the first pick-up members 621, and there is no particular limitation on the means as long as they can reliably fix the thread member 3 and move the thread member 3 together with the support 6. Using means for holding the thread member 3 instead of the first pick-up members 621 is preferable to causing the first pick-up members 621 to pick up the thread member 3 because it is easy to hold the thread member 3 and move the cleaning tool main bodies 10 from the first cavities 101 of the movable mold 100b.

Figure 7:
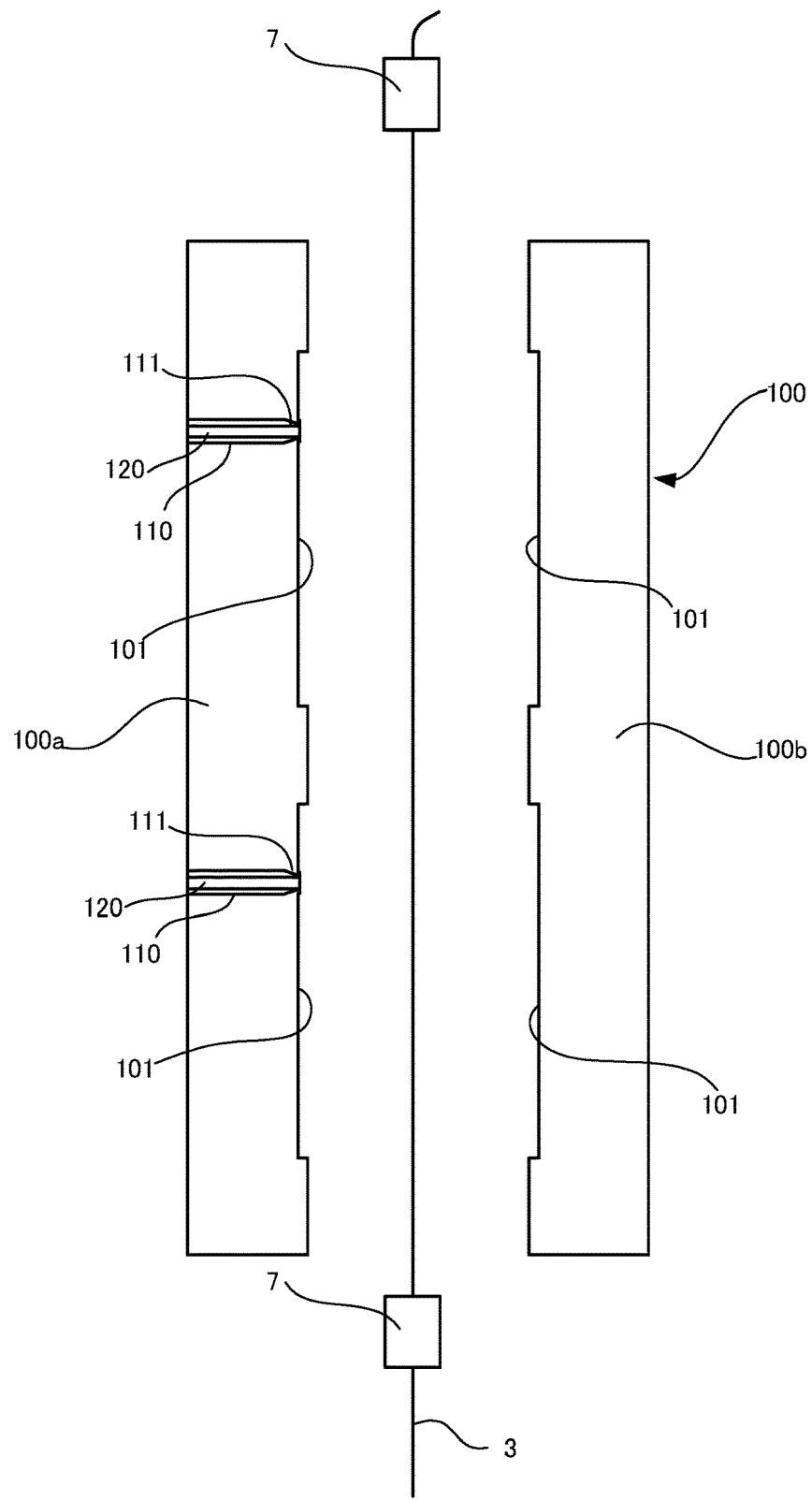
FIG. 7 is a diagram illustrating a method for producing the interdental cleaning tool shown in FIG. 1.

Next, the interdental cleaning tool producing method will be described with reference to FIGS. 7 to 11. First, as shown in FIG. 7, the movable mold 100b is moved away from the stationary mold 100a, and a gap is formed between the stationary mold 100a and the movable mold 100b. Next, the thread member 3 delivered from a delivery apparatus (not shown) arranged below the mold 100 is arranged between the stationary mold 100a and the movable mold 100b, and a portion of the thread member 3 located above the mold 100 and a portion of the thread member 3 located below the mold 100 are fixed using holding members 7 to arrange the thread member 3 at the above-described thread member position.

Figure 8:
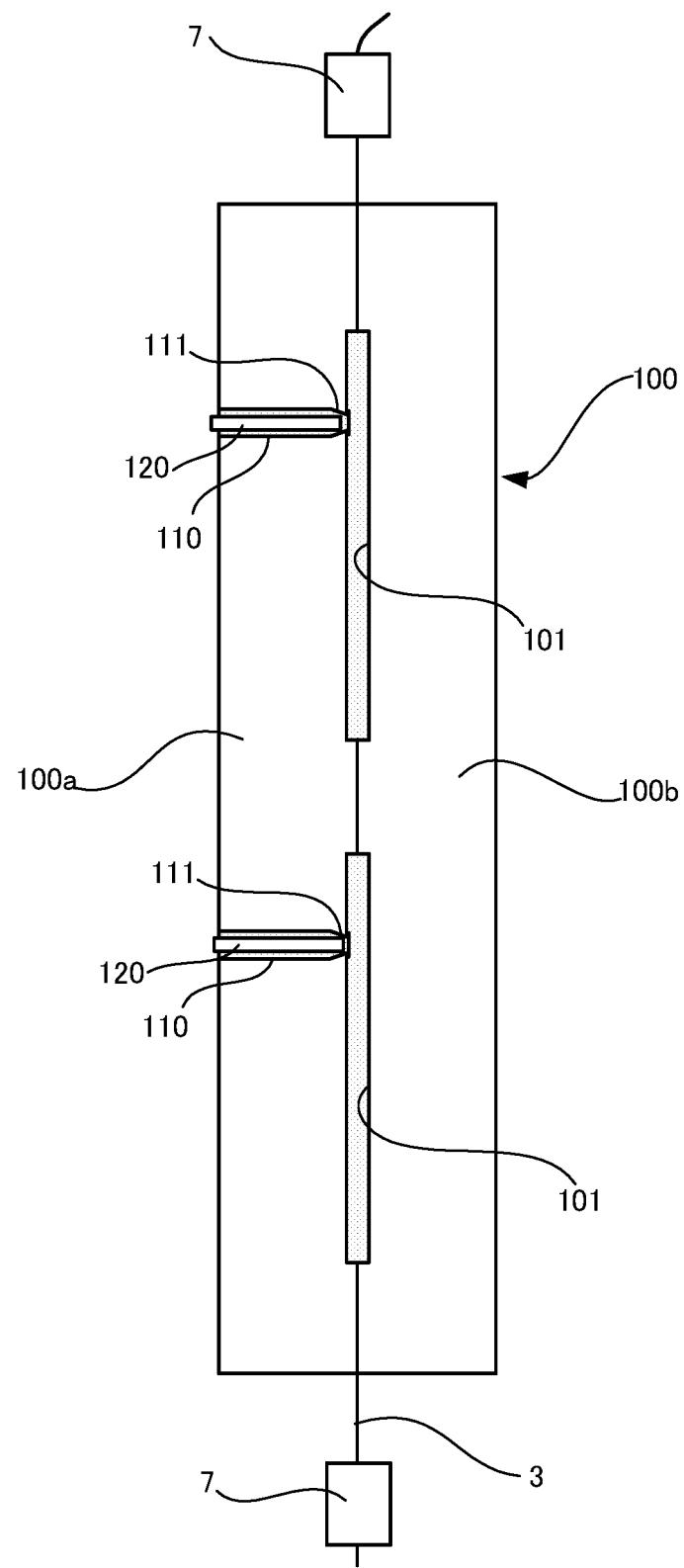
FIG. 8 is a diagram illustrating the method for producing the interdental cleaning tool shown in FIG. 1.

Subsequently, as shown in FIG. 8, the movable mold 100b is brought into contact with the stationary mold 100a, and the thread member 3 is thus sandwiched therebetween. Thereafter, the openings of the gates 110 are opened by moving back the valves 120, and a molten resin material is poured into the cavities 101. After pouring of the resin material is finished, the valves 120 are moved to close the openings of the gates 110. Then, the resin material is cooled for a predetermined period of time, and the molding of the cleaning tool main bodies 10 is thus finished.

In this state, the thread member 3 is embedded in the supporting pieces 21 and 22 and is integrated therewith, and the plurality of cleaning tool main bodies 10 are coupled by the single thread member 3.

Figure 9:
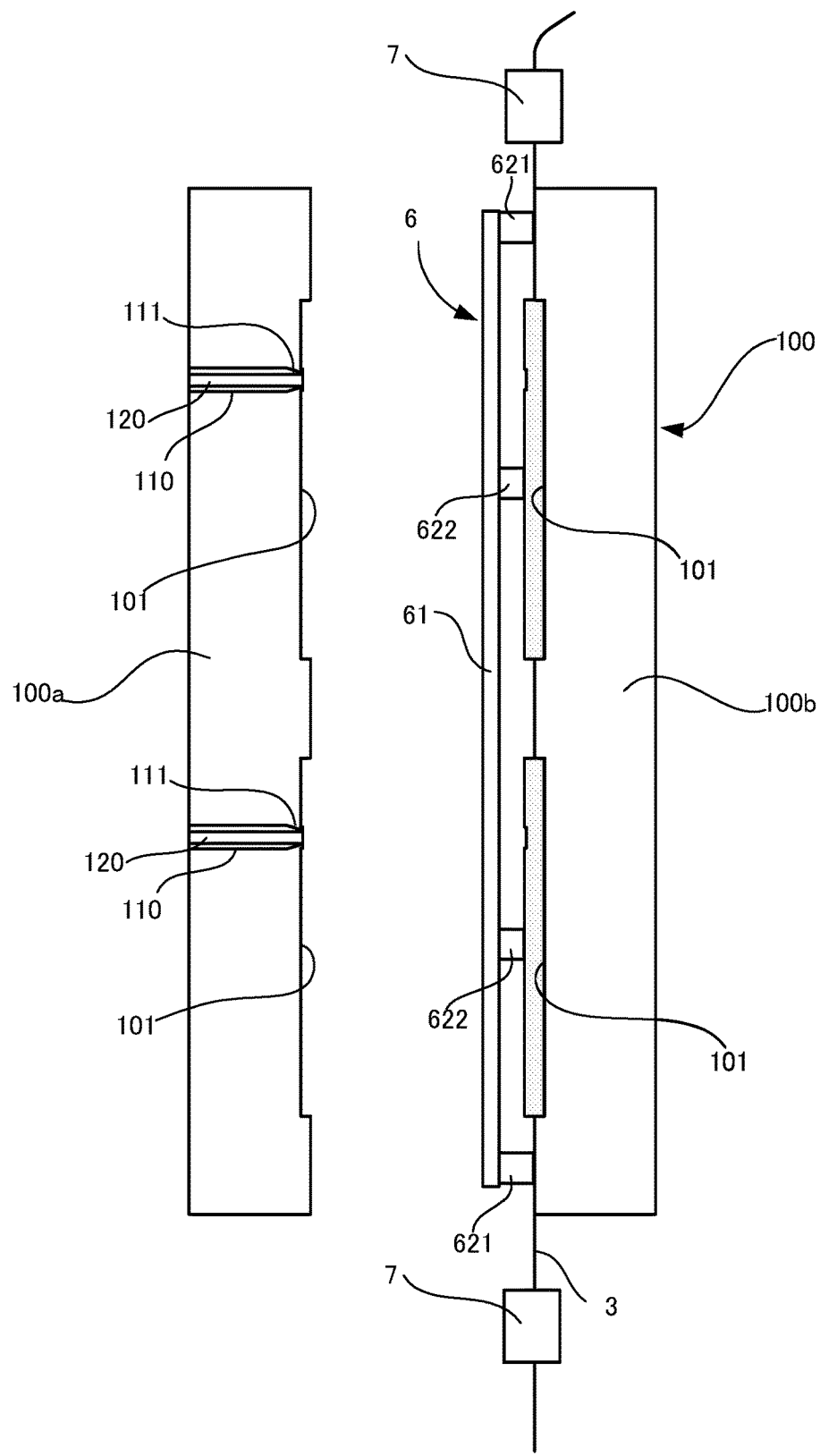
FIG. 9 is a diagram illustrating the method for producing the interdental cleaning tool shown in FIG. 1.
Figure 10:
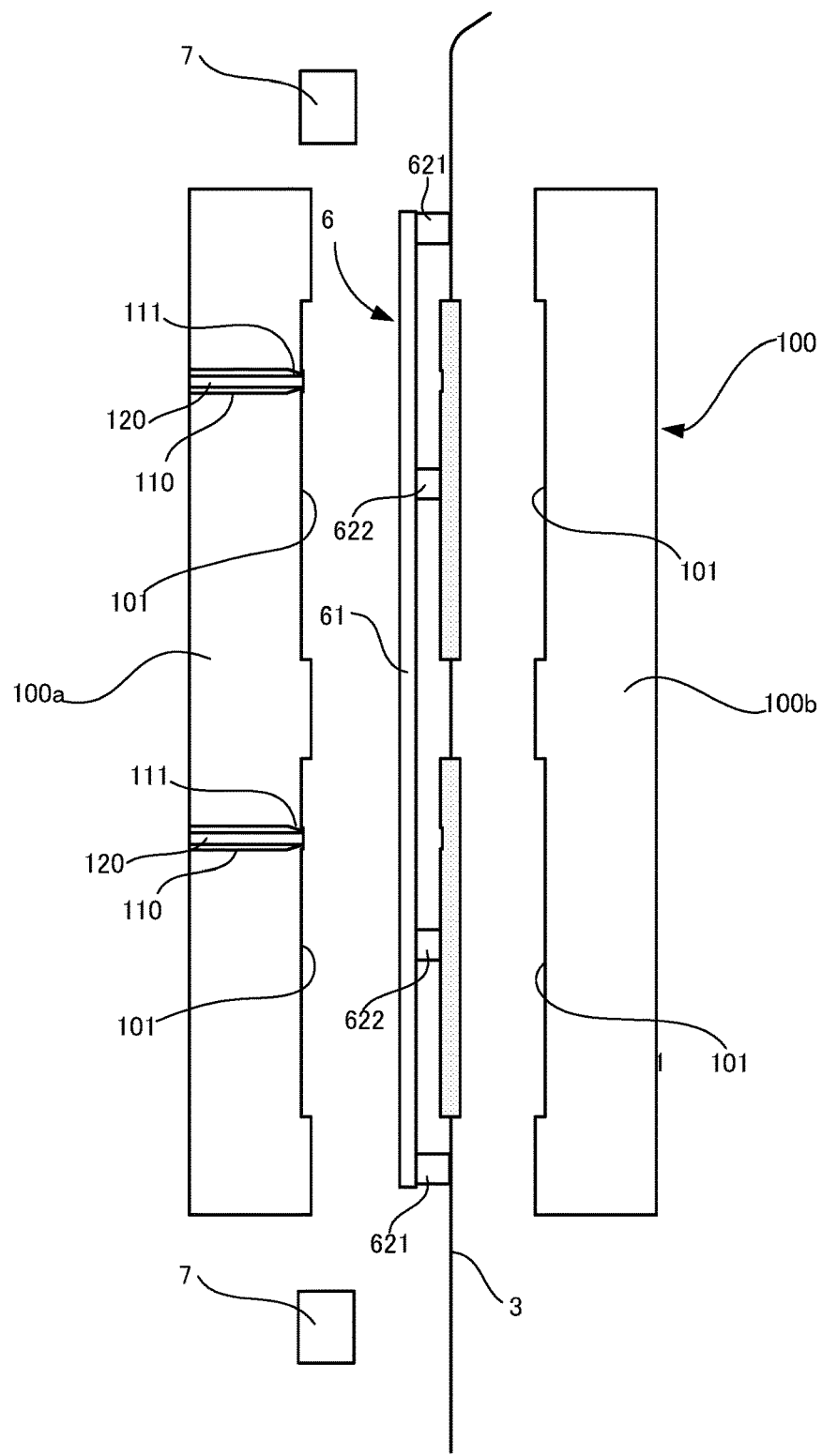
FIG. 10 is a diagram illustrating the method for producing the interdental cleaning tool shown in FIG. 1.
Figure 11:
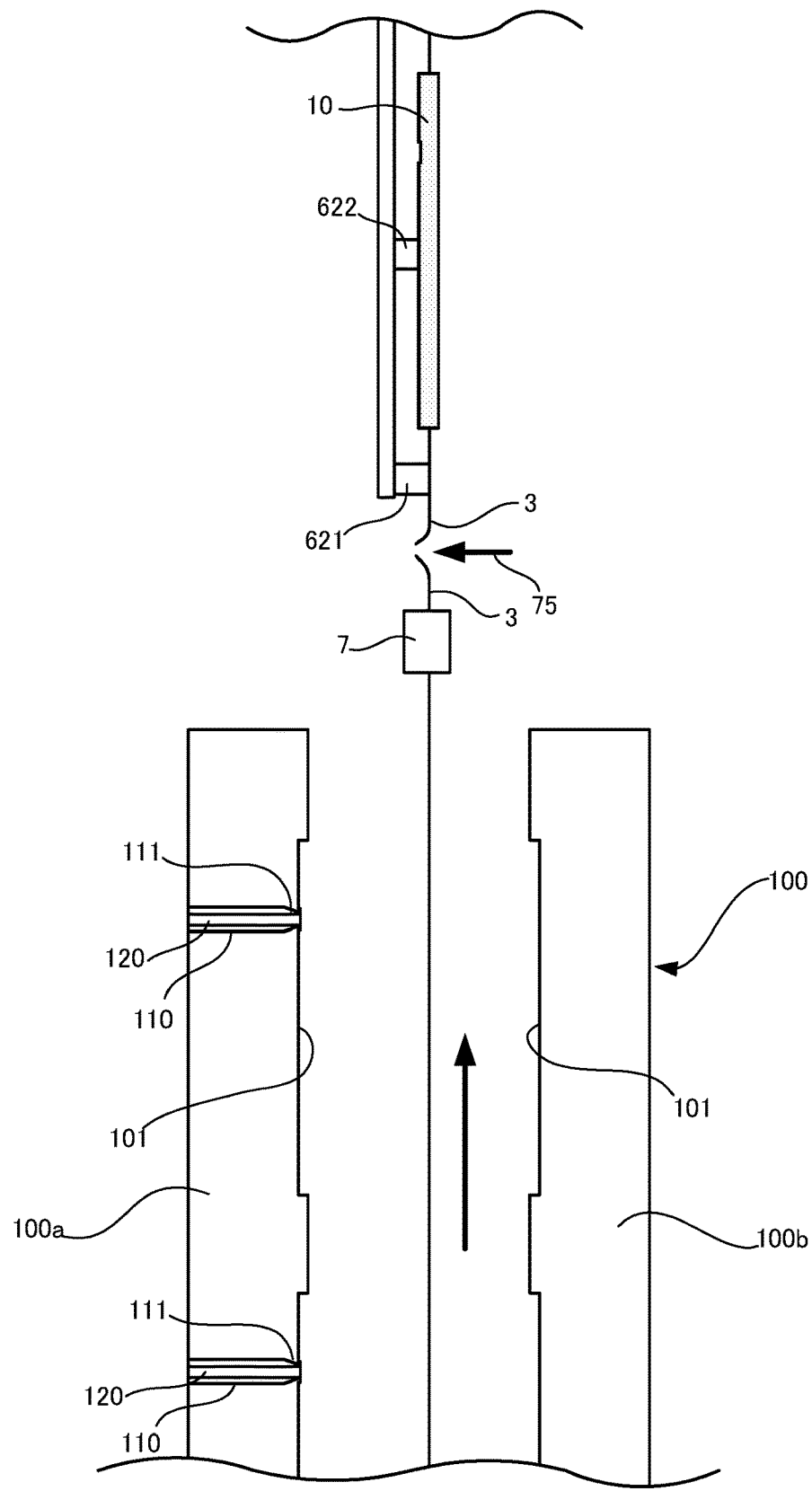
FIG. 11 is a diagram illustrating the method for producing the interdental cleaning tool shown in FIG. 1.

Next, the movable mold 100b is moved away from the stationary mold 100a. At this time, as shown in FIG. 9, the molded cleaning tool main bodies 10 are located on the movable mold 100b. Then, a robot arm is used to arrange the support 6 between the movable mold 100b and the stationary mold 100a, and the pick-up members 621 and 622 are brought into contact with the thread member 3 and the cleaning tool main bodies 10. After the pick-up members 621 and 622 have picked up the thread member 3 and the cleaning tool main bodies 10, the cleaning tool main bodies 10 are moved away from the first cavities 101 of the movable mold 100b by ejector pins (not shown) protruding from the inside of the movable mold while the support 6 is moved away from the movable mold 100b. In this state, a plurality of cleaning tool main bodies 10 are attached to the single thread member 3 between the first pick-up members 621. Subsequently, as shown in FIG. 10, the fixing of the thread member 3 by the holding members 7 located above and below the mold 100 is released, and the support 6 is moved upward from the mold 100 in the state in which the support 6 picks up the thread member 3 and the cleaning tool main bodies 10. Then, as shown in FIG. 11, after the thread member 3 is fixed using the holding members 7 again, the thread member 3 is cut at a position between the holding member 7 located above the mold 100 and the first pick-up member 621 located below the cleaning tool main bodies 10 using a cutting means 75 such as scissors.

Figure 12:
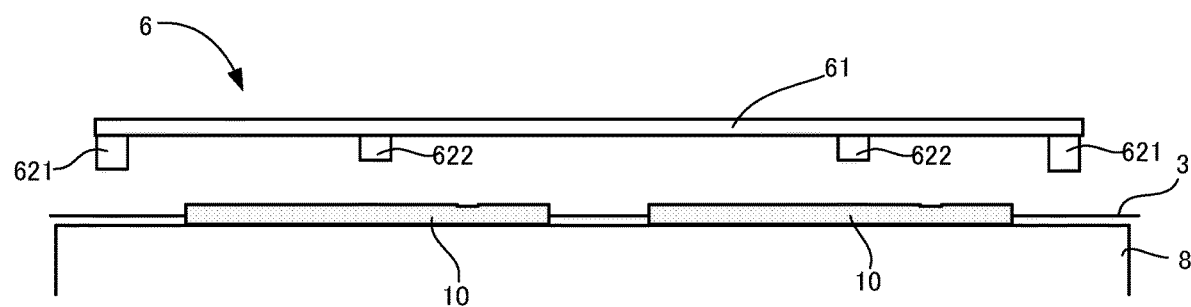
FIG. 12 is a diagram illustrating the method for producing the interdental cleaning tool shown in FIG. 1.

Subsequently, after the robot arm is moved and the orientation of the support 6 is changed such that the support 6 extends horizontally, the thread member 3 and the cleaning tool main bodies 10 are arranged on an examination table 8. Thereafter, as shown in FIG. 12, the pick-up members 621 and 622 are removed from the thread member 3 and the cleaning tool main bodies 10, and then the support 6 is moved to the vicinity of the mold 100. Meanwhile, the mold 100 is used to mold the next cleaning tool main bodies 10 through the above-described procedures shown in FIGS. 7 to 11.

Figure 13:
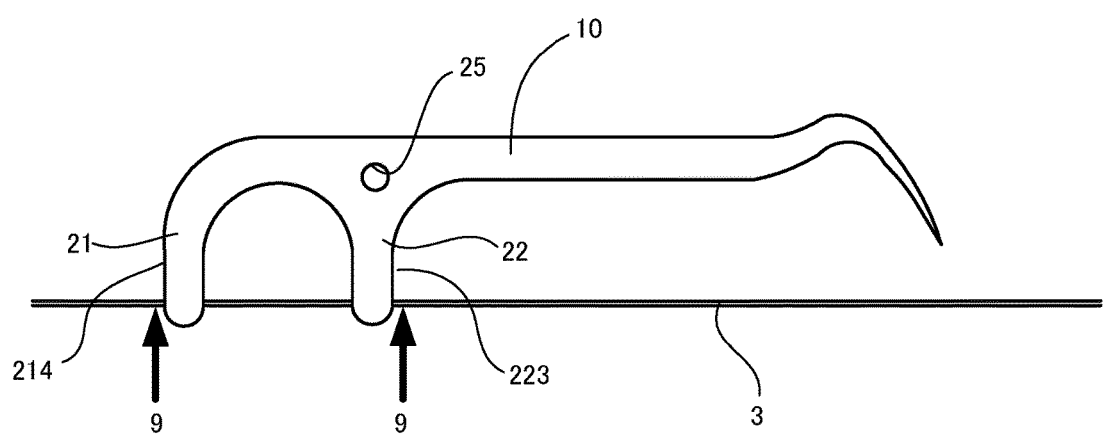
FIG. 13 is a diagram illustrating the method for producing the interdental cleaning tool shown in FIG. 1.

On the examination table 8, the aesthetic properties of the cleaning tool main bodies 10 and the thread member 3 are checked. At this time, the thread member 3 and the plurality of cleaning tool main bodies 10 are lined up on the examination table 8, thus making it easy to check them. In the next step, as shown in FIG. 13, the thread member 3 is cut at a position located near the left surface 214 of the first supporting piece 21 of the cleaning tool main body 10 and a position located near the right surface 223 of the second supporting piece 22 of the cleaning tool main body 10 using a Thomson blade. Although the thread member 3 is cut using a blade in this embodiment, there is no particular limitation on a means 90 for cutting the thread member 3. For example, the thread member 3 can be burned off using a flame or a heated-edge tool, or through radiation of heat rays such as far-infrared rays, or through electric discharge. A plurality of interdental cleaning tools in which the thread member 3 and the cleaning tool main body 10 are integrated together are thus formed.

6. Features

As described above, with this embodiment, the following effects can be obtained.

(1) A plurality of cleaning tool main bodies 10 are attached to a single thread member 3, thus making it easy to remove the cleaning tool main bodies 10 fixed to the thread member 3 from the mold 100 together with the thread member 3 by moving the thread member 3 from the mold 100. Therefore, by also employing a hot runner method, which will be described next, substantially no resin material is wasted, thus making it possible to reduce the cost.

(2) With the producing method according to this embodiment, the cavities 101 are filled with the resin material using a hot runner method, and therefore, a large number of runner portions that are difficult to recycle due to difficulty in separating the thread member 3 fixed thereto are not formed unlike a typical cold runner method. Accordingly, the amount of resin material to be disposed of can be significantly reduced. As a result, the production cost can be significantly reduced. Moreover, additional time to cool the runner portions is needed in the case of the cold runner method, but with the hot runner method, such time is not needed, thus making it possible to improve the production cycle.

(3) In the above-mentioned producing method, the valve gate system is employed. With this configuration, the cleaning tool main bodies 10 are cut off from the gates by blocking the supply of the resin material using the valves 120, thus making it possible to prevent the resin material from extending from the cleaning tool main bodies 10 like string.

B. Second Embodiment

Next, a second embodiment of the interdental cleaning tool producing method according to the present invention will be described with reference to the drawings. In the following description, only the differences between the first embodiment and the second embodiment will be described, and therefore, the same components are denoted by the same reference numerals, and the descriptions of the redundant components will be omitted. Accordingly, unless otherwise stated, the configurations shown in the first embodiment can also be applied to the second embodiment. Moreover, in the following description, the diagrams used in the description of the first embodiment are also referred to.

1. Interdental Cleaning Tool Producing Method

Figure 14:
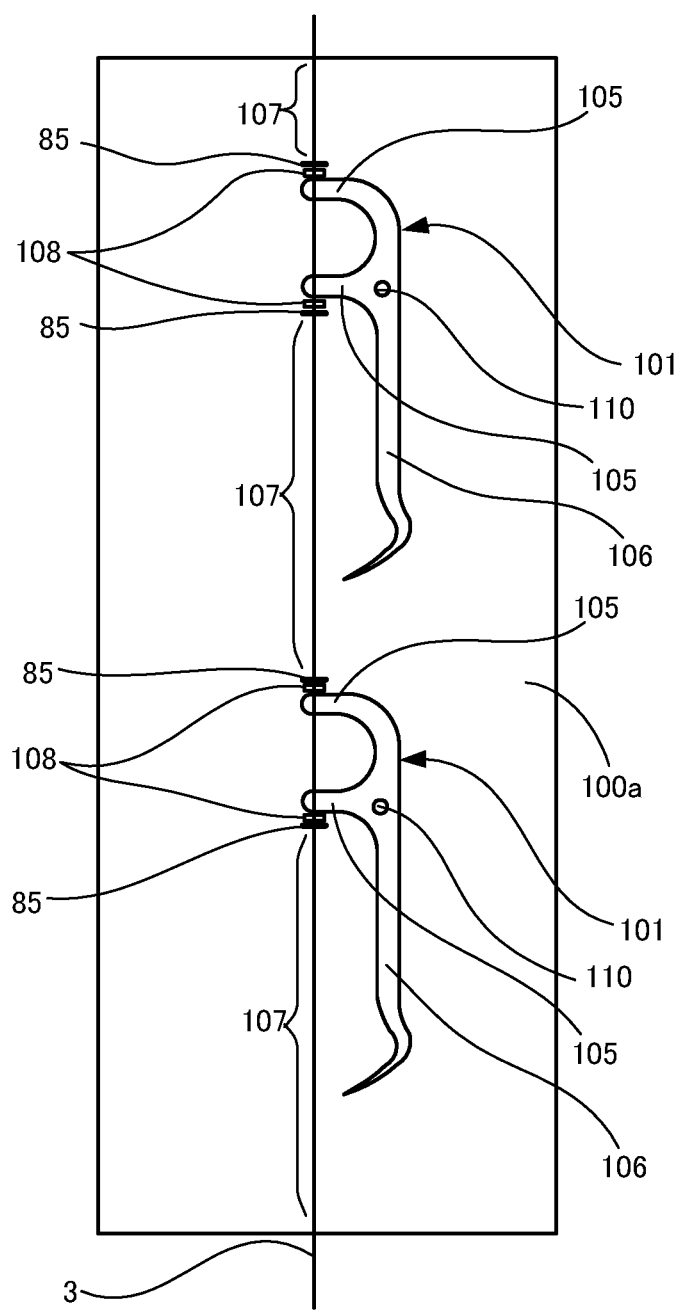
FIG. 14 is a schematic plan view showing a stationary mold of a mold for producing an interdental cleaning tool according to a second embodiment of the present invention.

FIG. 14 is a plan view of a stationary mold of a mold according to this embodiment. As shown in FIG. 14, on a stationary mold 100a of a mold 100 according to this embodiment, pressing members 108 that are formed in one piece with the stationary mold 100a and protrude toward a movable mold 100b side are arranged at positions located outside supporting piece cavities 105 (that is, positions located on sides opposite to a portion between the supporting piece cavities 105). Cutters 85 are respectively arranged outside the pressing members 108. The pressing members 108 press the thread member 3 against the stationary mold 100a when the stationary mold 100a and the movable mold 100b are brought into contact with each other. The cutters 85 cut the thread member 3 at ends of portions pressed by the pressing members 108 when the stationary mold 100a and the movable mold 100b are brought into contact with each other.

In the mold 100, suction ports (not shown) are formed in portions 107 that are parts of the portion on which the thread member 3 is arranged excluding the portions located between the supporting piece cavities 105. With this configuration, it is possible to perform suction of pieces that are cut from the thread member 3 and then separated from the cleaning tool main bodies 10.

Figure 15:
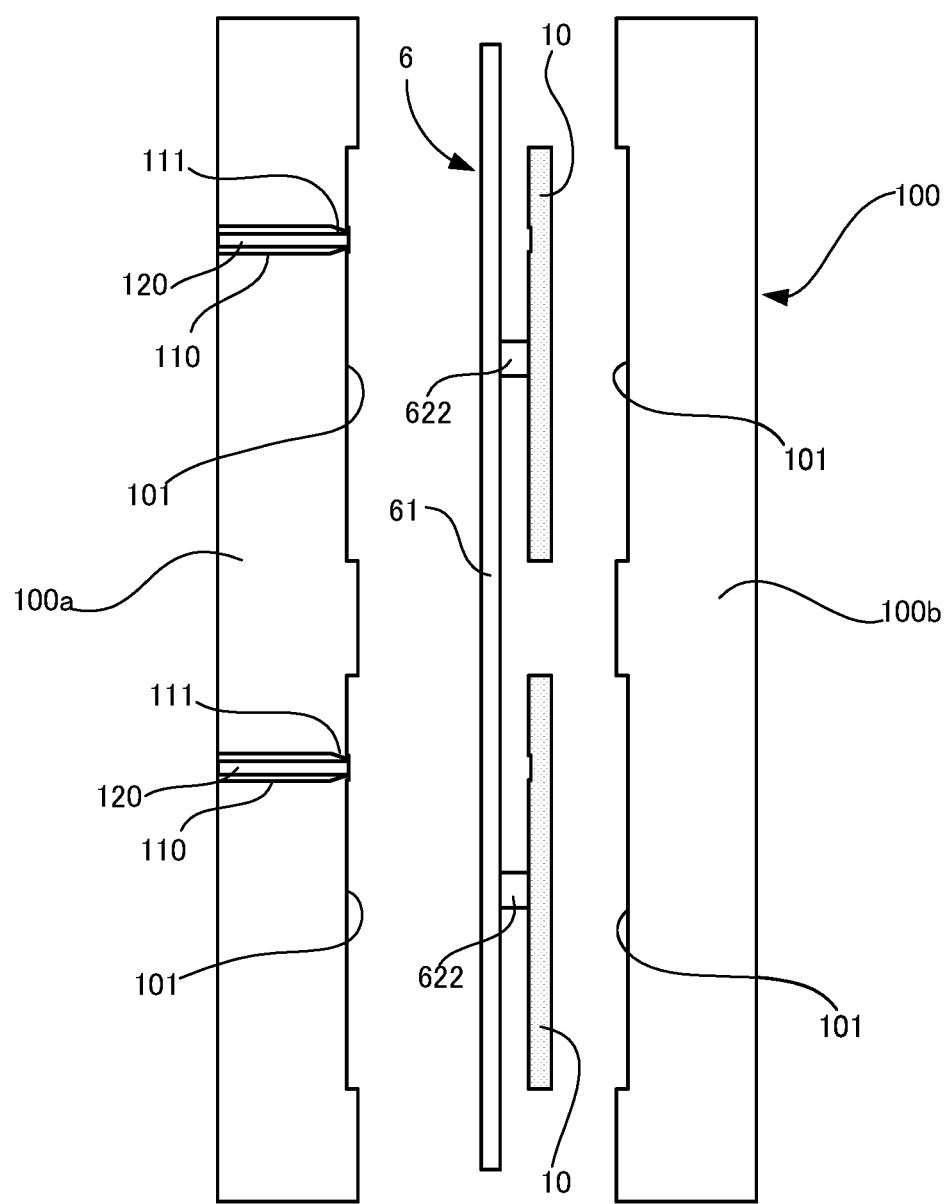
FIG. 15 is a diagram illustrating a method for producing the interdental cleaning tool according to the second embodiment.

Furthermore, as shown in FIG. 15, a support 6 is not provided with first pick-up members 621 but is provided with only second pick-up members 622 unlike the first embodiment.

When the above-described mold 100 is used, molding is performed as described below. That is, as shown in FIG. 7, the movable mold 100b is moved away from the stationary mold 100a, and a gap is formed between the stationary mold 100a and the movable mold 100b. Next, the thread member 3 delivered from a delivery apparatus (not shown) arranged below the mold 100 is arranged between the stationary mold 100a and the movable mold 100b, and a portion of the thread member 3 located above the mold 100 and a portion of the thread member 3 located below the mold 100 are fixed using holding members 7 to arrange the thread member 3 at the above-described thread member position.

Subsequently, as shown in FIG. 8, the movable mold 100b is brought into contact with the stationary mold 100a, and the thread member 3 is thus sandwiched therebetween. At this time, portions of the thread member 3 located outside the supporting piece cavities 105 are pressed by the pressing members 108. In this case, two ends of the cut thread member 3 are located outside each supporting piece cavity 105 and are pressed by the pressing members 108, and therefore, the thread member 3 does not come loose and predetermined tension is maintained. In this state, a resin material is poured in the same manner as mentioned above, and the resin material is cooled for a predetermined period of time. Then, the thread member 3 is cut at positions located outside the pressing members 108 using the cutters 85, and the molding of cleaning tool main bodies 10 is thus finished. As described above, the thread member 3 is embedded in the supporting pieces 21 and 22 and is integrated therewith, and the cleaning tool main bodies 10 are completed inside the mold 100. It should be noted that, although the pressing members 108 are provided in this embodiment, they need not be provided, and only the cutters 85 may be provided, for example. Moreover, retractable pressing members 108 may also be provided in the mold.

Next, while the movable mold 100b is moved away from the stationary mold 100a, suction of the pieces of the thread member 3 separated from the cleaning tool main bodies 10 is performed through the suction ports. Subsequently, as shown in FIG. 15, a robot arm is used to arrange the support 6 between the movable mold 100b and the stationary mold 100a. Then, after the second pick-up members 622 pick up the cleaning tool main bodies 10, the cleaning tool main bodies 10 are moved away from the first cavities 101 of the movable mold 100b by ejector pins (not shown) protruding from the inside of the movable mold 100b while the support 6 is moved away from the movable mold 100b. Thereafter, the robot arm is moved to arrange the cleaning tool main bodies 10 on an examination table 8, and the aesthetic properties are checked in the same manner as in the first embodiment.

2. Features

As described above, with this embodiment, the thread member 3 is cut inside the mold 100, and therefore, a step of cutting the thread member 3 becomes unnecessary in a later process. When the cleaning tool main bodies 10 are removed, the support 6 need not pick up the thread member 3 and need only pick up the cleaning tool main bodies 10, thus making it possible to simplify the configuration of the support 6. Furthermore, suction of the pieces that are cut from the thread member 3 can be performed in the mold 100, and therefore, a step of disposing of the pieces that are cut from the thread member 3 becomes unnecessary in a later process. In addition, with the producing method according to this embodiment, the cavities 101 are filled with the resin material using a hot runner method, and therefore, a large number of runner portions that are difficult to recycle due to difficulty in separating the thread member 3 fixed thereto are not formed unlike a typical cold runner method. Accordingly, the amount of resin material to be disposed of can be significantly reduced. As a result, the production cost can be significantly reduced. Moreover, additional time to cool the runner portions is needed in the case of the cold runner method, but with the hot runner method, such time is not needed, thus making it possible to improve the production cycle.

Figure 16:
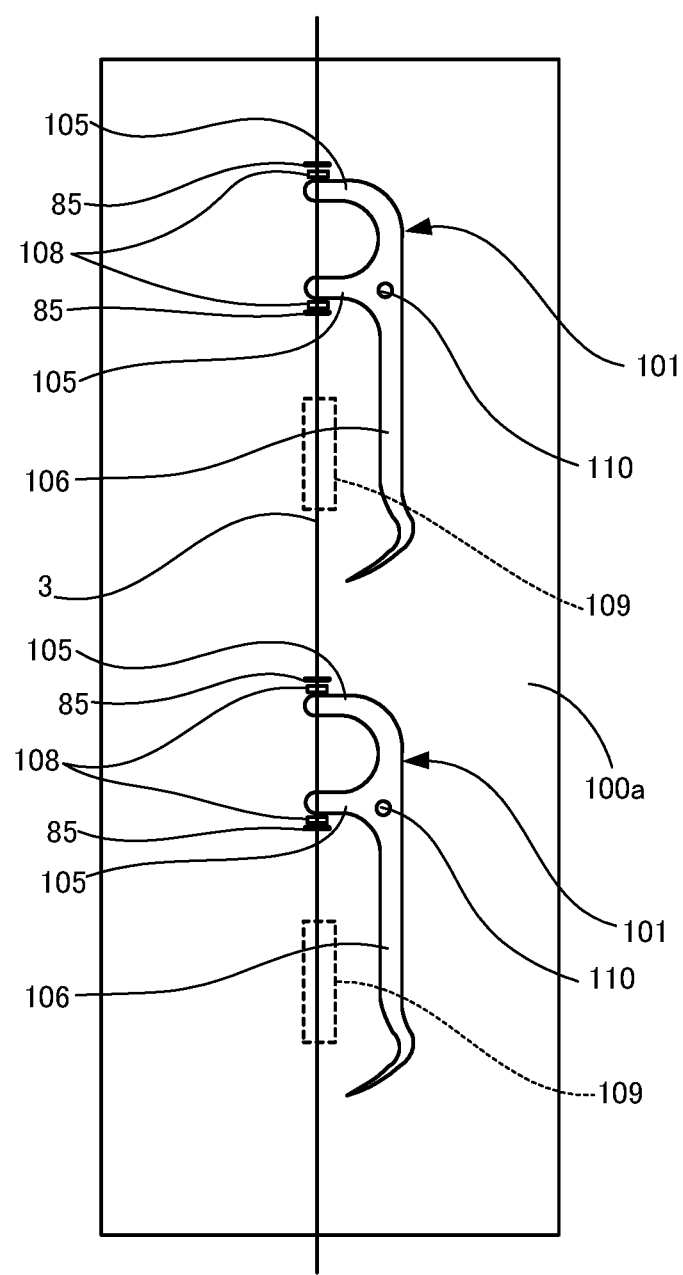
FIG. 16 is a plan view showing another example of the stationary mold shown in FIG. 14.

It should be noted that, with this embodiment, suction of the pieces of the thread member 3 is performed in the mold 100, and the pieces are then disposed of, but the following configuration can also be employed. That is, as shown in FIG. 16, disposal member cavities 109 for molding disposal members to be used to dispose of pieces of the thread member 3 are formed between the first cavities 101. These disposal member cavities 109 are formed at positions at which unnecessary pieces of the thread member 3 are arranged. With this configuration, when the disposal member cavities 109 are filled with the resin material, disposal members that are integrated with the piece of the thread member 3 are formed.

Therefore, when the movable mold 100b is moved away from the stationary mold 100a and the disposal members are pressed by ejector pins (not shown) after the thread member 3 is cut, the disposal members are moved away from the movable mold 100b together with the pieces of the thread member 3. Then, the disposal members and the pieces of the thread member 3 fall out of the mold 100 and are then disposed of. Accordingly, the suction ports through which suction of the pieces that are cut from the thread member 3 as described above become unnecessary. Subsequent steps are the same as those described above.

There is no particular limitation on the size, shape, and thickness of the disposal members. The disposal members are not particularly limited as long as they can be integrated with a piece of the thread member 3 and removed from the mold 100. However, it is preferable that the thickness and volume of the disposal members are smaller than that of the cleaning tool main bodies 10 from the viewpoint of reducing the amount of resin to be disposed of and reducing the cooling time. For example, the thickness of the disposal members can be set to 0.1 to 2 mm, and is preferably 0.1 to 1 mm. Moreover, for example, the volume of the disposal members can be set to 0.1 to 1 $cm^3$, and is preferably 0.1 to 0.5 $cm^3$.

C. Third Embodiment

Next, a third embodiment of the interdental cleaning tool producing method according to the present invention will be described with reference to the drawings. In the following description, only the differences between the first embodiment and the third embodiment will be described, and therefore, the same components are denoted by the same reference numerals, and the descriptions of the redundant components will be omitted. Accordingly, unless otherwise stated, the configurations shown in the first embodiment can also be applied to the third embodiment.

1. Interdental Cleaning Tool Producing Method

Figure 17:
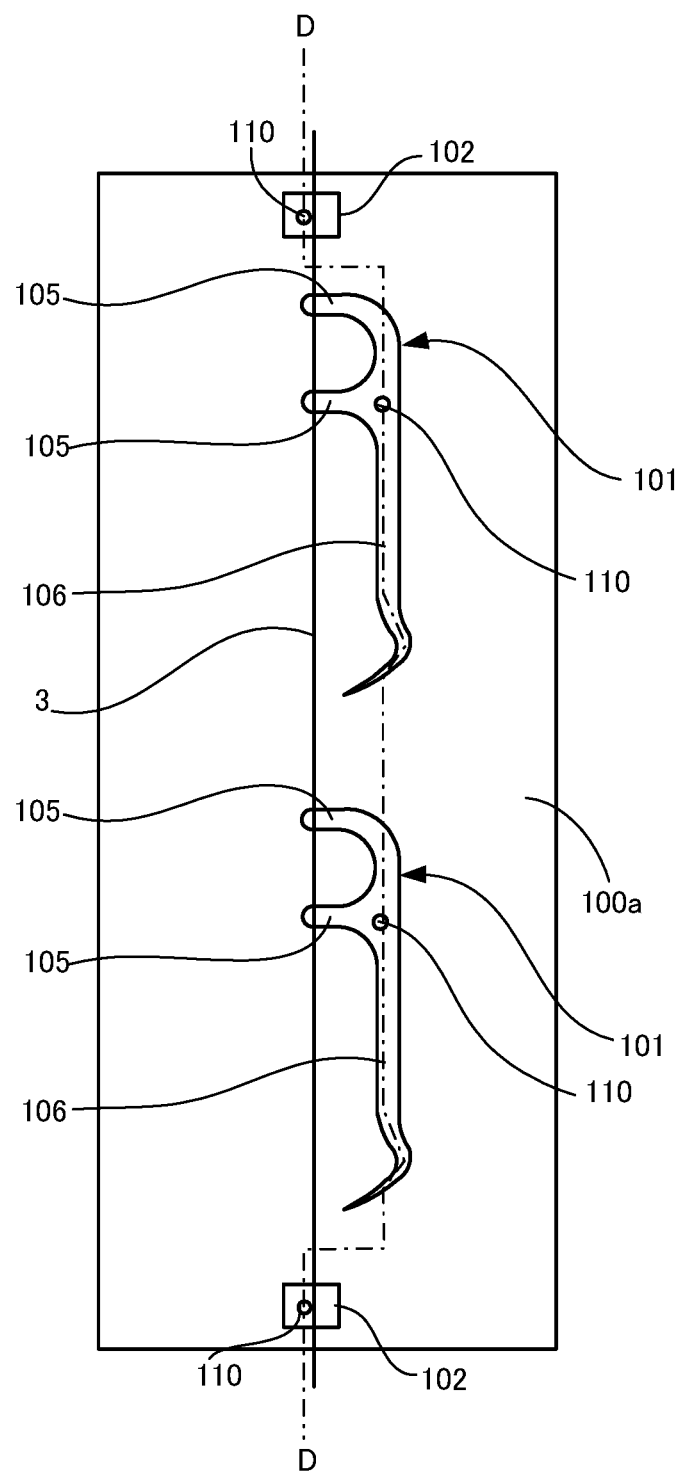
FIG. 17 is a schematic plan view showing a stationary mold of a mold for producing an interdental cleaning tool according to a third embodiment of the present invention.
Figure 18:
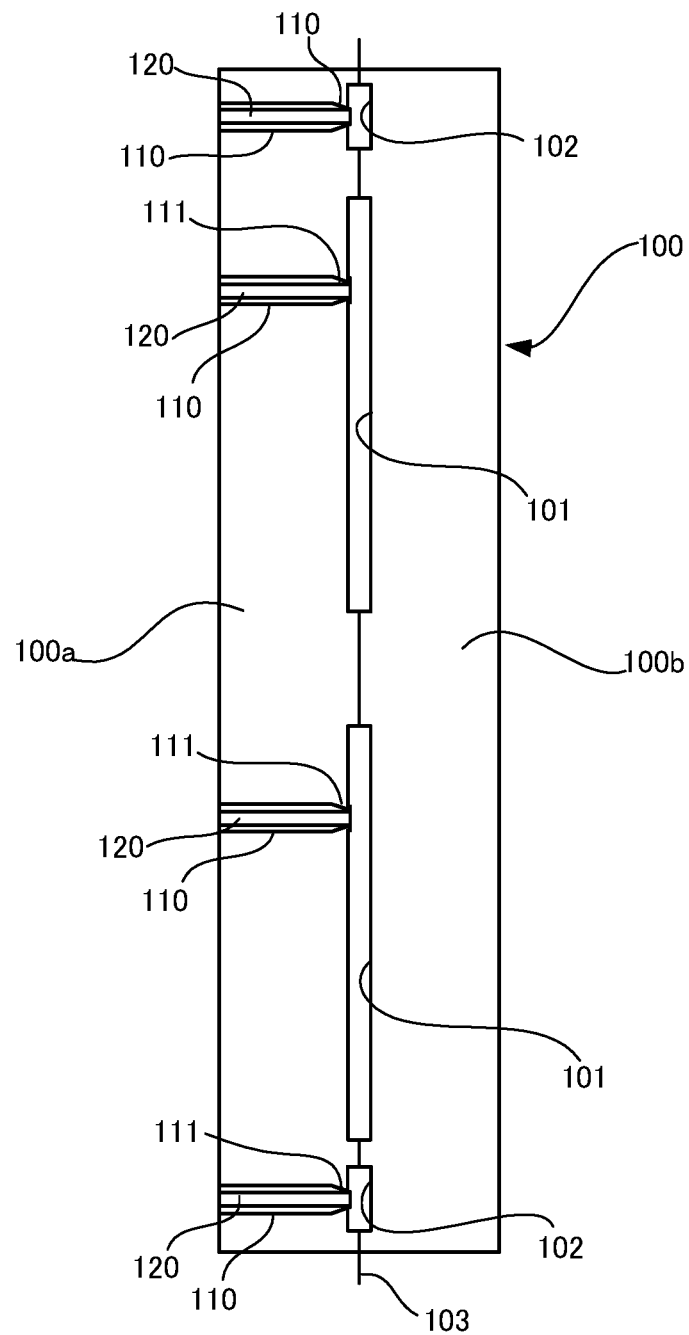
FIG. 18 is a cross-sectional view taken along line D-D in FIG. 17.

First, a mold will be described. FIG. 17 is a plan view of a stationary mold of a mold, and FIG. 18 is a cross-sectional view of the mold shown in FIG. 17 taken along line D-D. It should be noted that both the stationary mold and a movable mold are shown in FIG. 18. As shown in FIGS. 17 and 18, a plurality of (two in this embodiment) first cavities 101 that are the same as those in the first embodiment, and two second cavities 102 for molding removal members 50, which will be described later, are formed on a surface of each of a stationary mold 100a and a movable mold 100b, the surfaces being brought into contact with each other.

The plurality of first cavities 101 corresponding to cleaning tool main bodies 10 have the same configurations as those in the first embodiment, but the third embodiment is different from the first embodiment in that the removal members 50 are molded at the two end portions of a thread member 3. That is, as described above, in this mold 100, the second cavities 102 for molding the removal members 50 are formed at positions corresponding to the two end portions of the thread member 3 arranged at a thread member position.

The removal members 50 are formed into a thin plate having a rectangular shape in a plan view, and are molded such that the thread member 3 passes through the inside of the removal members 50. A circular recessed portion (not shown) is formed on the surface of each removal member 50, and this recessed portion corresponds to a gate 110 of the mold 100. The thickness of the removal members 50 (e.g., the thickness of the removal members 50 in a left-right direction in FIG. 21) is smaller than that of the cleaning tool main bodies 10. The thickness of the removal members 50 can be set to 0.1 to 2 mm, for example, and is preferably 0.1 to 1 mm. Furthermore, the volume of the removal members 50 is smaller than that of the cleaning tool main bodies 10. The volume of the removal members 50 can be set to 0.1 to 1 $cm^3$ for example, and is preferably 0.1 to 0.5 $cm^3$.

Figure 19:
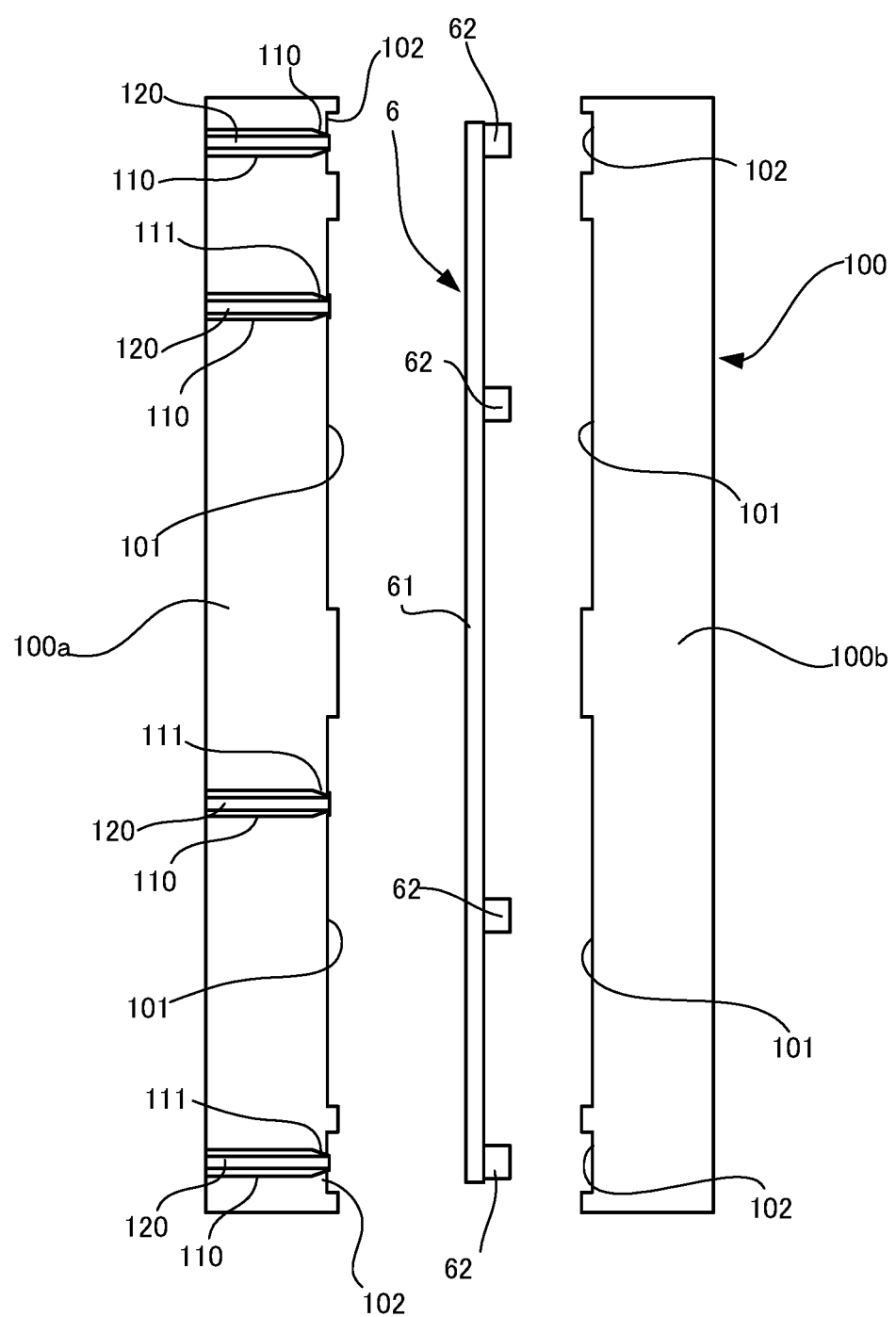
FIG. 19 is a diagram showing a state in which a support is arranged between the stationary mold and a movable mold of the mold in FIG. 18.
Figure 20:
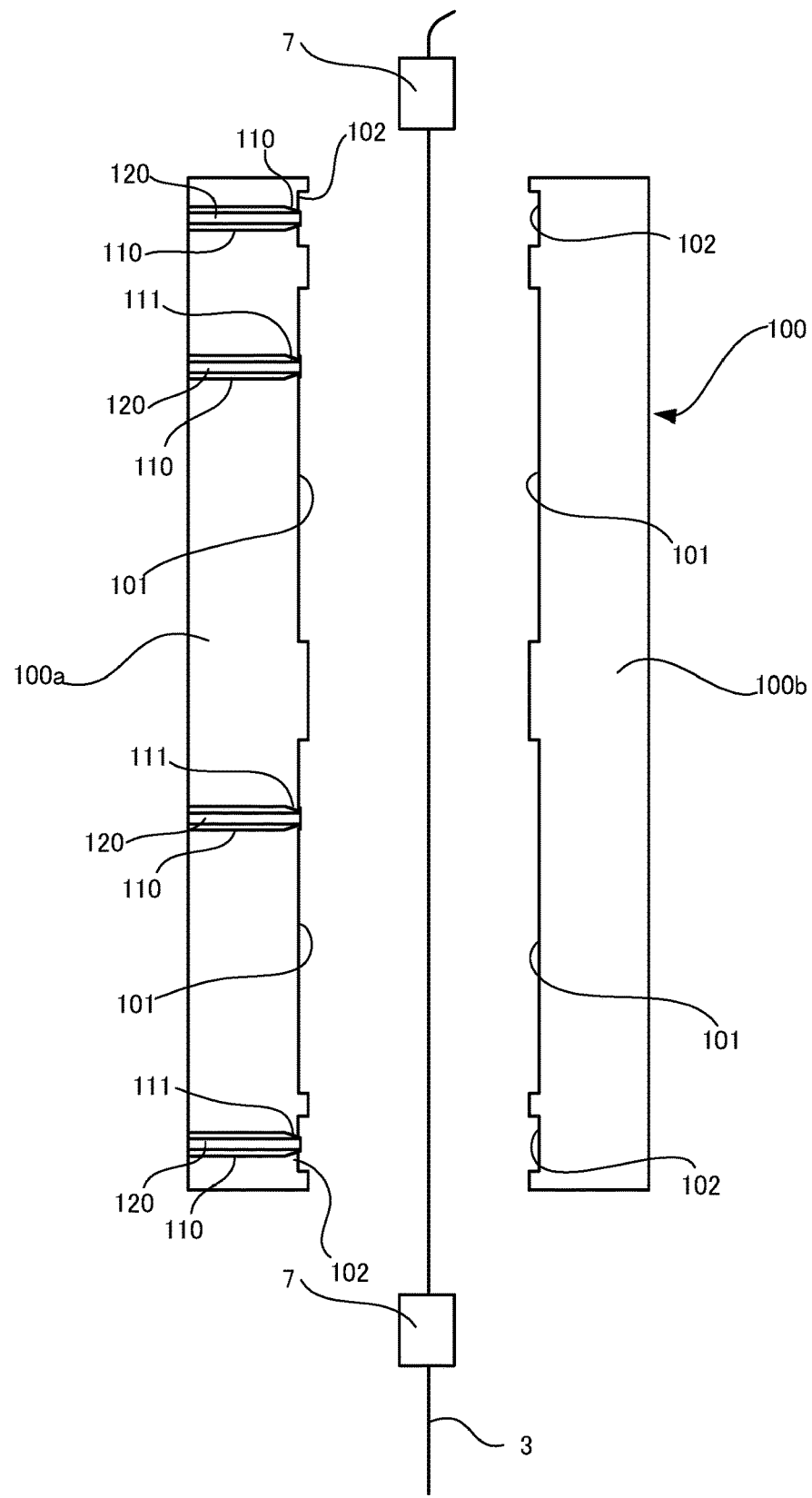
FIG. 20 is a diagram illustrating a method for producing the interdental cleaning tool according to the third embodiment.

As shown in FIG. 19, a support 6 used in this embodiment has the same configuration as that of the support 6 of the first embodiment, but is different from that of the first embodiment in that first pick-up members 621 are configured to pick up the removal members 50. It should be noted that, in this embodiment, the pick-up members 621 and 622 are respectively configured to pick up the removal members 50 and the cleaning tool main bodies 10 in order to stably move the cleaning tool main bodies 10 away from the first cavities 101 of the movable mold 100b, but only the first pick-up members 621 may be provided such that the support 6 can pick up only the removal members 50.

Next, the interdental cleaning tool producing method will be described with reference to FIGS. 20 to 24. First, as shown in FIG. 21, the thread member 3 is arranged between the movable mold 100b and the stationary mold 100a, and a portion of the thread member 3 located above the mold 100 and a portion of the thread member 3 located below the mold 100 are fixed using holding members 7, in the same manner as in the first embodiment.

Figure 21:
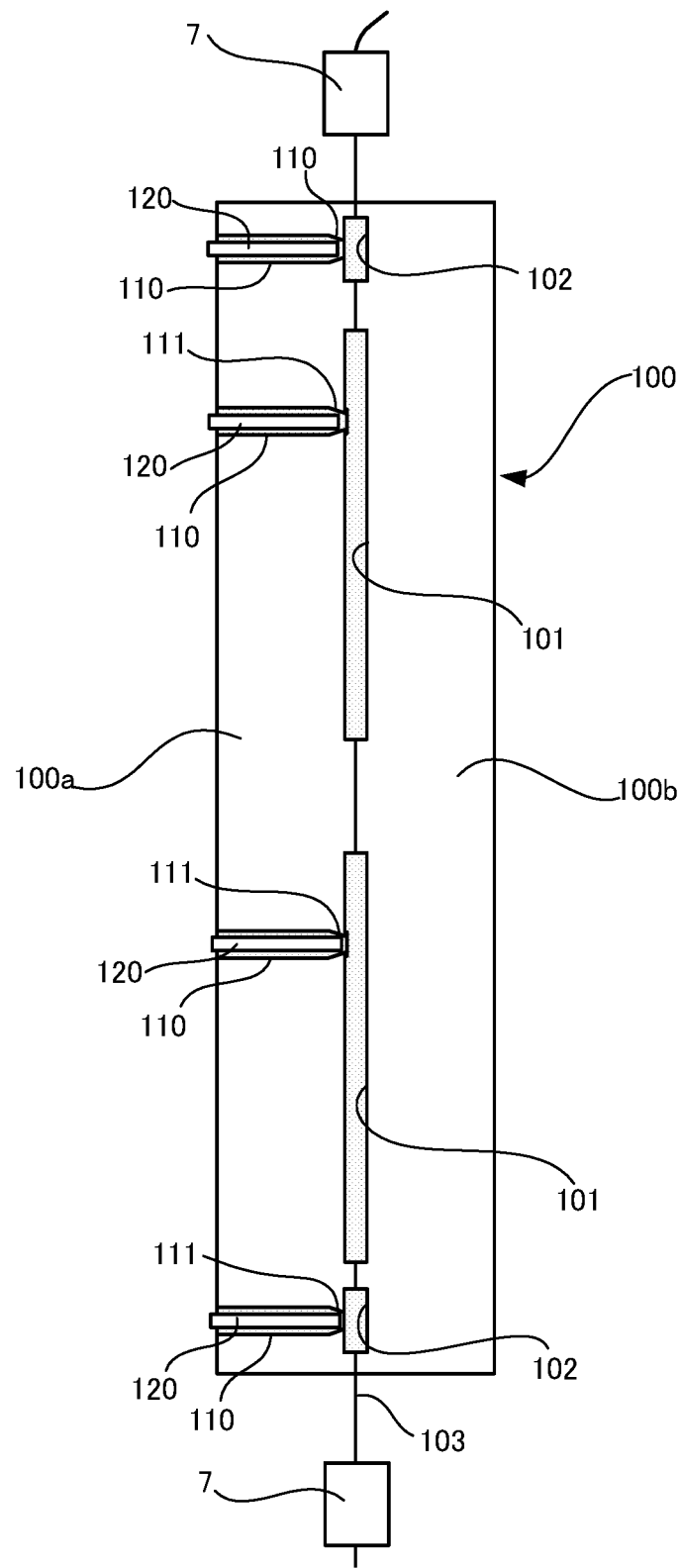
FIG. 21 is a diagram illustrating the method for producing the interdental cleaning tool according to the third embodiment.

Subsequently, as shown in FIG. 21, the movable mold 100b is brought into contact with the stationary mold 100a, and the thread member 3 is thus sandwiched therebetween. Thereafter, a molten resin material is poured into the cavities 101 and 102 in the same manner as in the first embodiment, and the resin material is cooled for a predetermined period of time. The molding of the removal members 50 and the cleaning tool main bodies 10 is thus finished.

In this state, the thread member 3 is integrated with the supporting pieces 21 and 22, and the plurality of cleaning tool main bodies 10 are coupled by the single thread member 3. The removal members 50 are respectively fixed to the two ends of the thread member 3 and integrated with the thread member 3.

Figure 22:
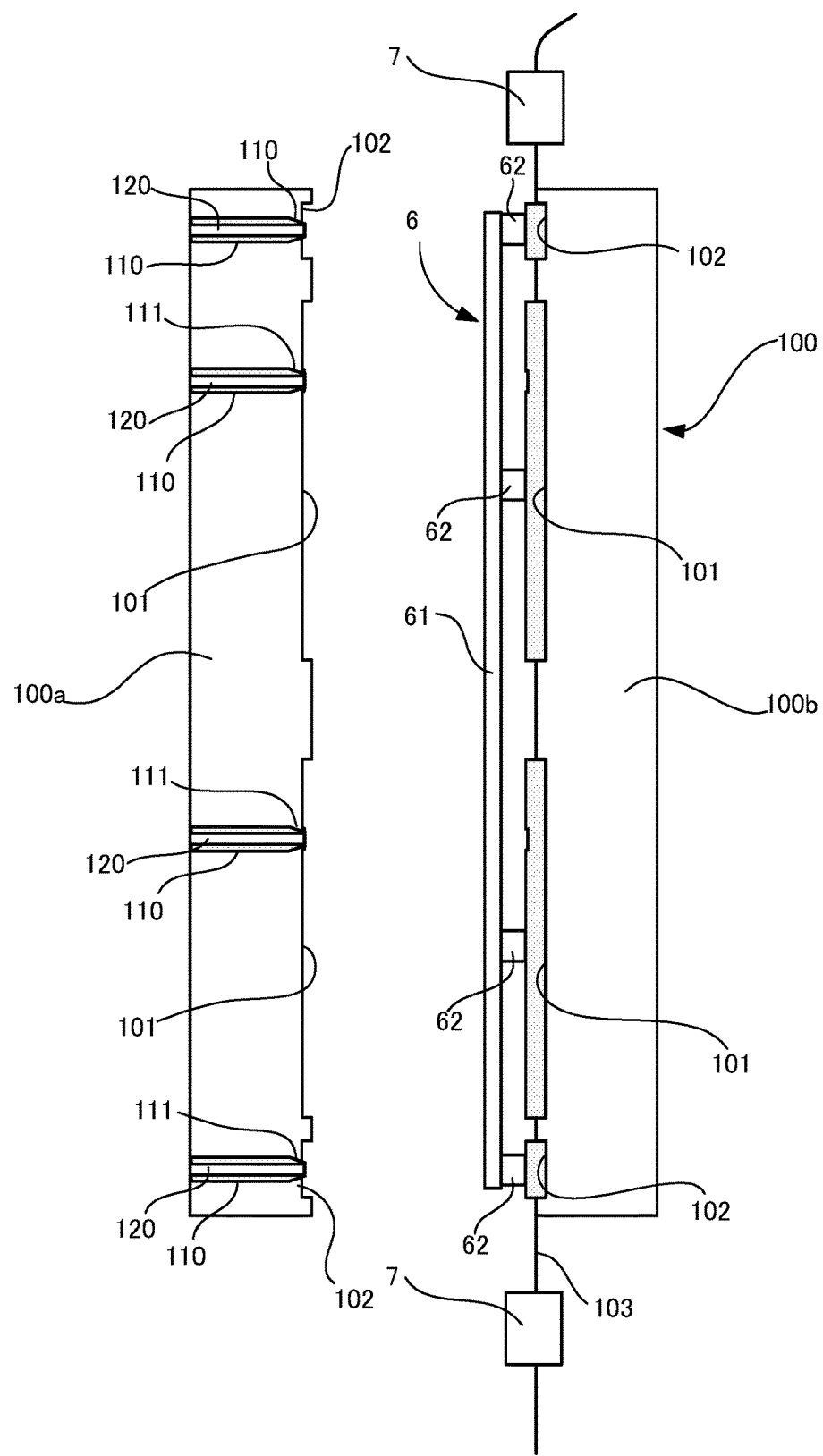
FIG. 22 is a diagram illustrating the method for producing the interdental cleaning tool according to the third embodiment.

Next, the movable mold 100b is moved away from the stationary mold 100a. At this time, as shown in FIG. 22, the molded removal members 50 and the molded cleaning tool main bodies 10 are located on the movable mold 100b. Then, after a robot arm is used to arrange the support 6 between the movable mold 100b and the stationary mold 100a, the pick-up members 621 and 622 are caused to pick up the removal members 50 and the cleaning tool main bodies 10.

Figure 23:
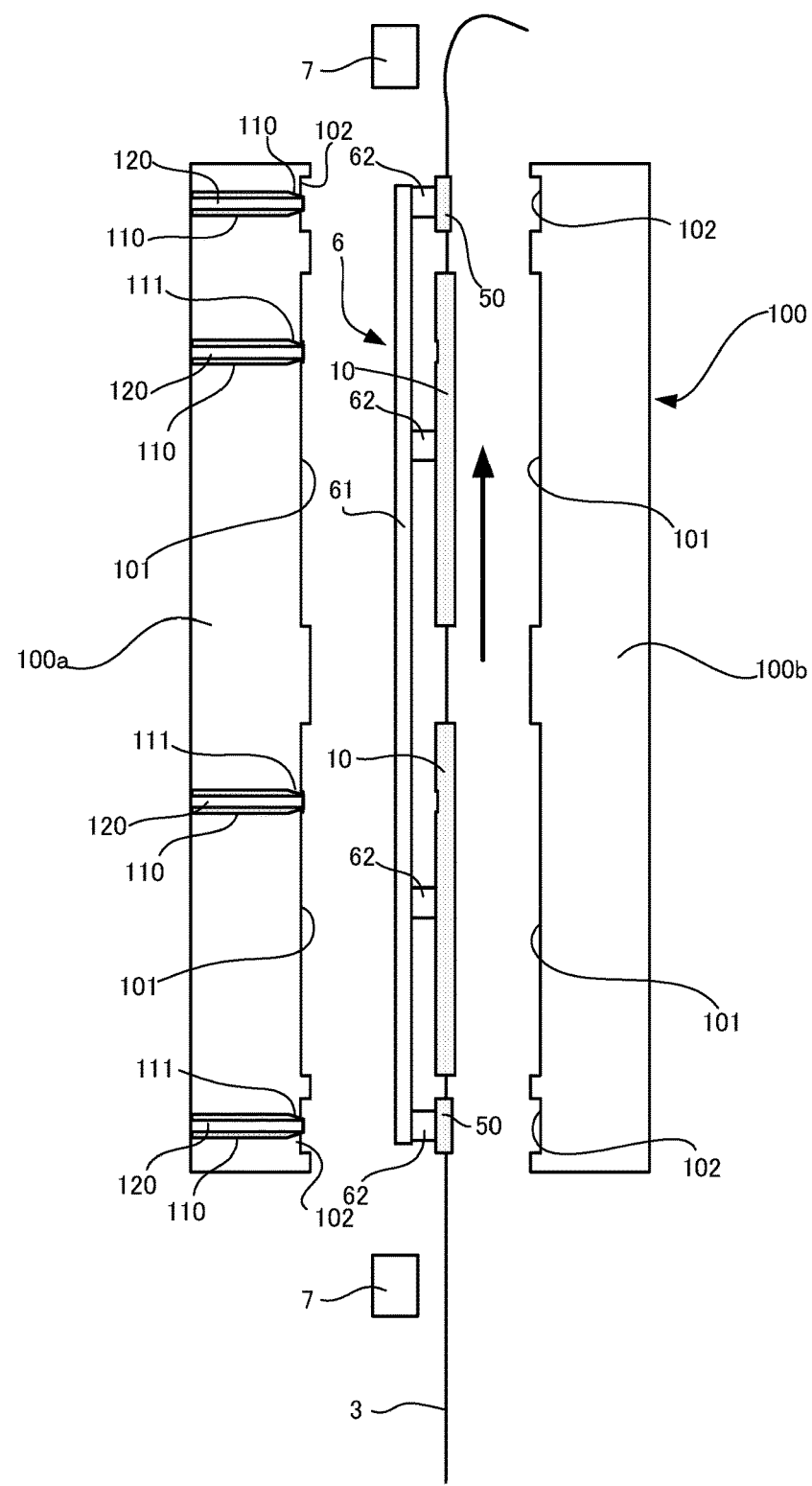
FIG. 23 is a diagram illustrating the method for producing the interdental cleaning tool according to the third embodiment.
Figure 24:
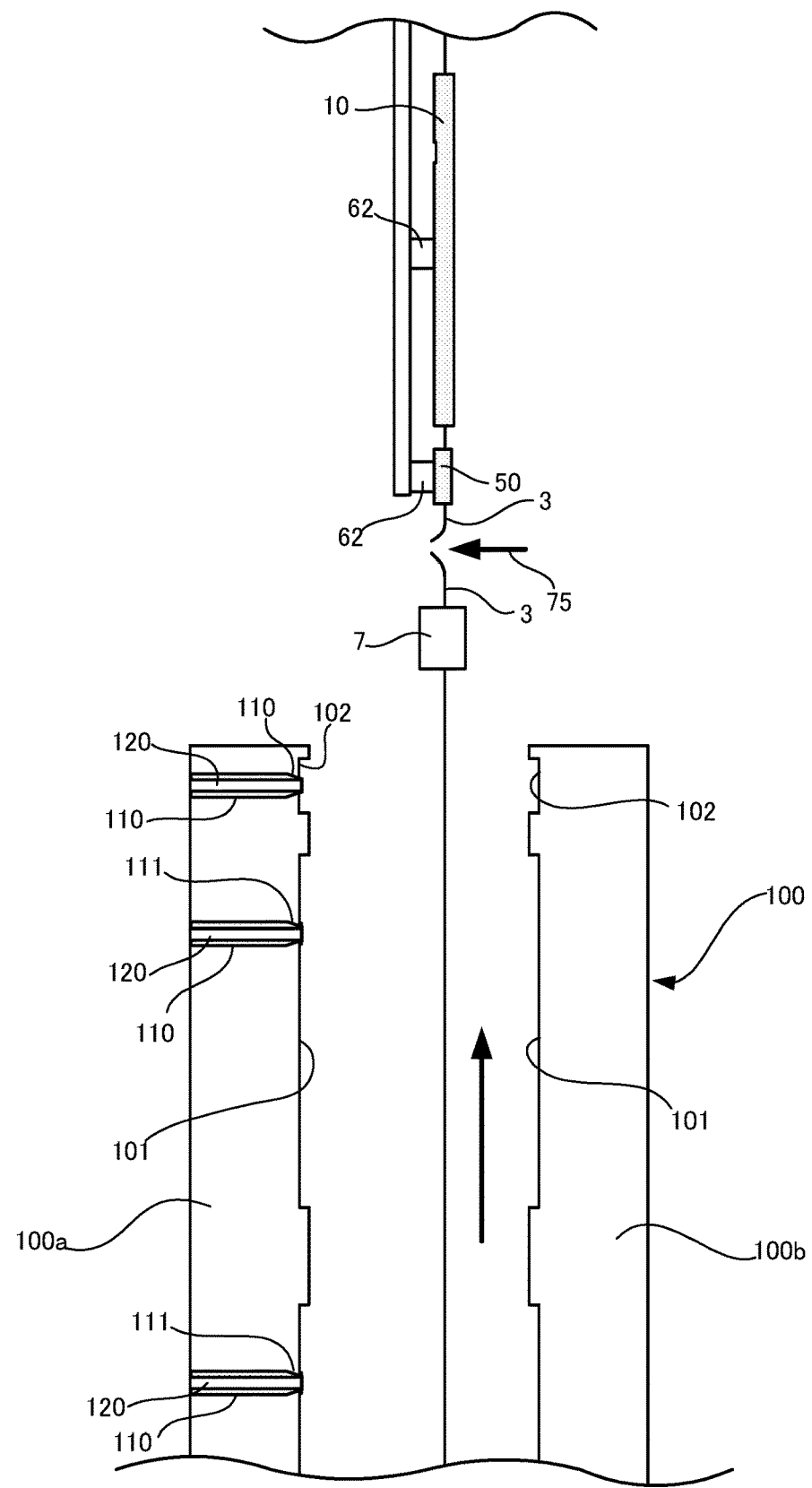
FIG. 24 is a diagram illustrating the method for producing the interdental cleaning tool according to the third embodiment.

Then, the removal members 50 and the cleaning tool main bodies 10 are moved away from the first cavities 101 and the second cavities 102 of the movable mold 100b by ejector pins (not shown) protruding from the inside of the movable mold while the support 6 is moved away from the movable mold 100b. Subsequently, as shown in FIG. 23, the fixing of the thread member 3 by the holding members 7 located above and below the mold 100 is released, and the support 6 is moved upward from the mold 100 in the state in which the support 6 picks up the removal members 50 and the cleaning tool main bodies 10. Then, as shown in FIG. 24, after the thread member 3 is fixed using the holding members 7 again, the thread member 3 is cut at a position between the holding member 7 located above the mold 100 and the removal member 50 located below the cleaning tool main bodies 10 using a cutting means 75 such as scissors.

Subsequently, after the robot arm is moved in the same manner as in the first embodiment, the removal members 50 and the cleaning tool main bodies 10 are arranged on an examination table 8. Thereafter, as shown in FIG. 12, the pick-up members 621 and 622 are removed from the removal members 50 and the cleaning tool main bodies 10, and then the support 6 is moved to the vicinity of the mold 100, in the same manner as in the first embodiment.

On the examination table 8, the aesthetic properties of the cleaning tool main bodies 10 and the thread member 3 are checked. At this time, on the examination table 8, the thread member 3 and the plurality of cleaning tool main bodies 10 are lined up between the two removal members 50, thus making it easy to check them. Then, as shown in FIG. 13, the thread member is cut in the same manner as in the first embodiment. A plurality of interdental cleaning tools in which the thread member 3 and the cleaning tool main body 10 are integrated together are thus formed.

2. Features

As described above, with this embodiment, the following effects can be obtained in addition to the above-mentioned effects obtained in the first embodiment.

(1) A plurality of cleaning tool main bodies 10 are attached to a single thread member 3, and the removal members 50 are molded at two end portions of the thread member 3, thus making it easy to remove the thread member 3 and the cleaning tool main bodies 10 fixed to the thread member 3 from the mold 100 together with the removal members 50 by moving the removal members 50 from the mold 100. Such removal members 50 need only have a size that allows at least the thread member 3 to be fixed to the removal members 50, and therefore, the removal members 50 need not be formed in a size similar to the sizes of the runner portions of the conventional example. Since the thread member 3 is fixed to the removal members 50, it is impossible to recycle the removal members 50. However, the size of the removal members 50 can be reduced to the minimum required size, and therefore, the amount of resin material to be disposed of can be suppressed to the minimum even if the removal members 50 are disposed of. Accordingly, as a result, it is possible to reduce the cost. Moreover, providing the removal members 50 at the two end portions makes it possible to stably line up the plurality of cleaning tool main bodies 10 when cutting the thread member 3 at a position located near the left surface 214 of the first supporting piece 21 and a position located near the right surface 223 of the second supporting piece 22, thus making it easy to cut the thread member 3. Providing the removal members 50 and causing the first pick-up members 621 to pick up the removal members 50 makes it easier to remove the cleaning tool main bodies 10 from the first cavities 101 of the movable mold 100b compared with the case where the first pick-up members 621 directly pick up the thread member 3 and the case where the thread member 3 is directly held.

(2) In the above-mentioned interdental cleaning tool producing method, the thickness of the removal members 50 is set to be smaller than that of the cleaning tool main bodies 10, or the volume of the removal members 50 is set to be smaller than that of the cleaning tool main bodies 10. Therefore, the removal members 50 can be cooled in less time than the time required to cool the cleaning tool main bodies 10. As a result, it is possible to prevent an increase in the production cycle time.

D. Modified Examples

Although the embodiments of the present invention have been described above, the present invention is not limited to the above embodiments, and various modifications can be carried out without departing from the gist of the invention. It should be noted that modified examples below can be implemented in combination as appropriate.

With the above-mentioned embodiments, the thread member 3 is a bundle of multifilaments 31, but the number of multifilaments 31 may also be one.

With the above-mentioned embodiments, the two end portions of the thread member 3 are respectively fixed to the supporting pieces 21 and 22, but the two end portions of each multifilament 31 are melted to form masses at the two end portions of the thread member 3 in order to prevent the thread member 3 from being dislodged. In addition to thermal welding, various types of welding using ultrasonic waves and the like can be performed as the melting method.

The thread member 3 may be formed by merely bundling a plurality of multifilaments 31, or by twisting the plurality of multifilaments 31 from the viewpoint of suppressing the separation of the multifilaments 31 from each other when arranging the thread member 3 at the thread member position.

There is no particular limitation on the shape of the cleaning tool main body 10 as long as the two supporting pieces 21 and 22 and the handle portion 1 are provided. For example, the thickness of the parts of the cleaning tool main body 10 is not limited to the above-described thickness, and can be changed as appropriate.

With the above-mentioned third embodiment, the removal members 50 are provided at the two ends of the thread member 3, but a removal member 50 can also be provided at only one end of the thread member 3. Even in this case, it is sufficient that the one removal member 50 and the cleaning tool main bodies 10 are pulled and removed from the mold 100, and then the thread member 3 and the cleaning tool main bodies 10 hang from the removal member 50 and moved.

There is no particular limitation on the size and shape of the removal members 50. It is preferable that the thickness and volume thereof are smaller than those of the cleaning tool main bodies 10, but there is no limitation thereto. Those of a slightly larger size and volume are also allowable.

With the above-mentioned embodiments, the valve gate system is employed for the mold 100, but an open gate system can also be employed.

With the producing methods according to the above-mentioned embodiments, a single thread member 3 is arranged in a single mold 100, and the removal members 50 and the cleaning tool main bodies 10 that are lined up in one row are molded. However, a configuration can also be employed in which a plurality of thread members 3 are arranged and removal members 50 and cleaning tool main bodies 10 that are lined up in a plurality of rows are molded.

In the producing methods according to the above-mentioned embodiments, there is no particular limitation on the method of arranging the thread member 3 in the mold 100 and the method of removing the thread member 3 from the mold 100. Examples thereof have been described above. Therefore, a member for mold removal such as the above-mentioned support 6 can be modified as appropriate.

LIST OF REFERENCE NUMERALS

1 Handle portion
21, 22 Supporting piece
3 Thread member
50 Removal member
100 Mold
101 First cavity
102 Second cavity
110 Gate
120 Valve

The invention claimed is:

1. An interdental cleaning tool producing method comprising:
   a first step of preparing a mold provided with i) plurality of first cavities for molding cleaning tool main bodies each including two supporting pieces that are arranged with a predetermined interval and a handle portion that couples the two supporting pieces and can be held in a hand, each of the plurality of first cavities having a handle cavity for forming the handle portion and the two supporting piece cavities for forming the two supporting pieces, ii) plurality of gates, each of the gates being connected to only one of the first cavities, and the mold being configured such that a thread member to span between the two supporting pieces can be arranged in the mold;
   a second step of arranging the thread member in the mold so that the thread member spans the plurality of the first cavities;
   a third step of filling each of the first cavities with a resin material via one of the gates provided in the mold using a hot runner method so that i) each of the cleaning tool main bodies is fixed to the thread member at the two supporting pieces, ii) the handle portion of each of the cleaning tool main body is aligned in a generally linear fashion along the thread member, and iii) the cleaning tool main bodies are not connected to each other with the resin material; and
   a fourth step of removing the thread member and the cleaning tool main bodies fixed to the thread member from the mold.

2. The interdental cleaning tool producing method according to claim 1,
   wherein, in the fourth step, the cleaning tool main bodies fixed to the thread member are removed from the mold together with the thread member by moving the thread member from the mold.

3. The interdental cleaning tool producing method according to claim 1, further comprising a step of cutting the thread member at positions outside the supporting pieces of the cleaning main body inside the mold prior to the fourth step.

4. The interdental cleaning tool producing method according to claim 1,
   wherein the mold is further provided with a second cavity for molding a removal member on at least one end portion side of the thread member, in the third step, the first cavities and the second cavity are filled with the resin material using a hot runner method, and in the fourth step, the thread member and the cleaning tool main bodies fixed to the thread member are removed from the mold together with the removal member by moving the removal member from the mold.

5. The interdental cleaning tool producing method according to claim 1, wherein, in the fourth step, a new thread member for a subsequent molding process can be arranged in the mold after the thread member to which the cleaning tool main bodies are fixed is moved in a direction in which the thread member extends.

6. The interdental cleaning tool producing method according to claim 1, wherein the gate is opened/closed using a valve by a valve gate system.

7. The interdental cleaning tool producing method according to claim 1, wherein the mold is further provided with a second cavity for molding a removal member on at least one end portion side of the thread member, the second cavity, in the third step, the first cavities and the second cavity are filled with the resin material using the hot runner method, so that i) the handle portions and the removal member are aligned in a generally linear fashion along the thread member and ii) the cleaning tool bodies body and the removal member are fixed on the thread member, in the fourth step, the thread member and the cleaning tool main bodies fixed to the thread member are removed from the mold together with the removal member by moving the removal member from the mold, and the gate is opened/closed using a valve by a valve gate system.

* * * * *